US006732075B1

(12) United States Patent
Omori et al.

(10) Patent No.: US 6,732,075 B1
(45) Date of Patent: May 4, 2004

(54) SOUND SYNTHESIZING APPARATUS AND METHOD, TELEPHONE APPARATUS, AND PROGRAM SERVICE MEDIUM

(75) Inventors: Shiro Omori, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/556,036

(22) Filed: Apr. 20, 2000

(30) Foreign Application Priority Data

Apr. 22, 1999 (JP) ........................................ P11-115415

(51) Int. Cl.[7] ................................................ G10L 17/00
(52) U.S. Cl. ......................... 704/250; 704/226; 704/223
(58) Field of Search ................................ 704/250, 223, 704/226, 264

(56) References Cited

U.S. PATENT DOCUMENTS

| | | | | |
|---|---|---|---|---|
| 5,473,727 | A | * 12/1995 | Nishiguchi | 704/222 |
| 5,502,713 | A | 3/1996 | Lagerqvist et al. | 370/17 |
| 5,752,222 | A | * 5/1998 | Nishiguchi | 704/201 |
| 5,848,387 | A | * 12/1998 | Nishiguchi | 704/214 |
| 5,873,060 | A | * 2/1999 | Ozawa | 704/230 |
| 5,909,663 | A | * 6/1999 | Ijimia | 704/226 |
| 5,960,388 | A | * 9/1999 | Nishiguchi | 704/208 |

FOREIGN PATENT DOCUMENTS

| | | | |
|---|---|---|---|
| EP | 0751493 | 1/1997 | G10L/5/06 |
| WO | 9315502 | 8/1993 | G10L/9/02 |

* cited by examiner

*Primary Examiner*—Richemond Dorvil
*Assistant Examiner*—Kinari Patel
(74) *Attorney, Agent, or Firm*—Jay H. Maioli

(57) ABSTRACT

In a sound synthesizer, a noise adder generates a noise signal having a frequency band of 3,400 to 4,600 Hz, adjusts the gain of the noise signal, and adds the gain-adjusted noise signal to an excitation source after being filled with zeros by a zero-filling circuit, thereby providing a wide-band excitation source which is rather flat. The signal gain is adjusted by determining a narrow-band excitation source or a power of the wide-band excitation source after being filled with zeros and fitting the gain to the narrow-band excitation source or the power.

23 Claims, 20 Drawing Sheets

SOUND SYNTHESIZING APPARATUS AND METHOD, TELEPHONE APPARATUS, AND PROGRAM SERVICE MEDIUM

BACKGROUND OF THE INVENTION

1. Field of the Invention

The present invention relates to a sound synthesizing apparatus and method, adapted to synthesize at a receiving side a wide-band signal from an input narrow-band sound signal or its parameters transmitted by a communications system or a broadcasting system, for example. The present invention also relates to a telephone apparatus adopting the sound synthesizing apparatus and method, and a program service medium by which the sound synthesizing method is served as a program.

2. Description of the Related Art

The sound quality of the conventional wire telephone and radio telephone has not satisfied the telephone users. One of the reasons for such a low sound quality lies in the fact that the frequency band of the current telephony is limited to a range of 300 to 3,400 Hz.

Since the transmission path for use in the telephony is limited by the relevant rules and standards, it is difficult to widen the frequency band. For a higher sound quality in the field of the telephony, various methods have been proposed to predict at the receiving side an out-of-band component of a received sound and generate a wider-band signal.

Typically, there has been proposed a method in which based on the well-known method for linear predictive coding (LPC) analysis and synthesis, used in the sound signal processing, both a linear predictive factor $\alpha$ acquired from a narrow-band sound signal and a linear prediction residual or an excitation source acquired by quantizing the residual are band-widened and a wide-band sound is synthesized by the LPC from the band-widened linear predictive factor $\alpha$ and excitation source.

However, since the wide-band sound thus acquired is distorted, the frequency component of the original sound is filtered out of the synthesized wide-band sound and it is added to the original sound.

There has also been proposed an excitation source frequency band widening method in which taking in consideration the fact that an excitation source is a nearly white noise, a zero is inserted between two successive samples to generate an aliasing component and this component is taken as a wide-band excitation source.

When one zero is inserted between two successive samples, for example, the spectrum will appear symmetrical with respect to the Nyquist frequency taken as a line. Therefore, this method will be somehow effective for acquiring a wide-band excitation source from a narrow-band excitation source which is originally a nearly white noise.

On the assumption that the sampling frequency of a narrow-band signal is 8 kHz, that of a wide-band signal is 16 kHz and a narrow-band excitation source is limited to 300 to 3,400 Hz, for example, the wide-band excitation source acquired by the above-mentioned method will be of 300 to 3,400 Hz and 4,600 to 7,700 Hz with a gap between 3,400 and 4,600 Hz. Thus, the frequency band corresponding to this gap will not be generated even by the wide-band LPC synthesis but a wide-band sound not containing a frequency band corresponding to the gap will be generated. Thus, the wide-band sound is not any natural sound.

As in the above, since the excitation source resulted from the LPC synthesis including the band widening, etc. is low in quality, the synthesized signal will also have a low quality.

OBJECT AND SUMMARY OF THE INVENTION

It is therefore an object of the present invention to overcome the above-mentioned drawbacks of the prior art by providing a sound synthesizing apparatus and method capable of synthesizing a quality wide-band signal through improvement of the quality of the excitation source.

It is another object of the present invention to provide a telephone apparatus having a receiving means capable of providing a quality wide-band signal by adopting the above sound synthesizing apparatus and method.

It is further object of the present invention to provide a program service medium serving the sound synthesizing method in the form of a program and thus capable of providing a quality wide-band signal inexpensively.

According to the present invention, there is provided a sound synthesizing apparatus for synthesizing a wide-band signal from a part of an output signal acquired by a filtering synthesis whose input parameter is a linear prediction residual or excitation source of a narrow-band signal, the apparatus including means for adding a noise signal to the linear prediction residual or excitation source.

According to the present invention, there is also provided a sound synthesizing apparatus for synthesizing a wide-band signal from a part of an output signal acquired by a filtering synthesis whose input parameter is a linear prediction residual or excitation source of a narrow-band signal, the apparatus including means for generating a wide-band excitation source from the linear prediction residual or excitation source and means for adding a noise signal to the wide-band excitation source.

According to the present invention, there is also provided a sound synthesizing apparatus for synthesizing a wide-band signal from a part of an output signal acquired by a filtering synthesis whose input parameter is a linear prediction residual or excitation source of a narrow-band signal, the apparatus including means for adding a noise signal to the linear prediction residual or excitation source and means for generating a wide-band excitation source from the linear prediction residual or excitation source to which the noise signal has been added by the noise adding means.

According to the present invention, there is also provided a sound synthesizing apparatus for synthesizing a wide-band signal from a part of an output signal acquired by a filtering synthesis whose input parameter is a linear prediction residual or excitation source of a narrow-band signal, the apparatus including means for analyzing the narrow-band signal to provide a linear prediction residual signal, means for generating a wide-band residual signal from the linear prediction residual acquired by means of the analyzing means, and means for adding to the wide-band residual signal a noise signal having a signal component whose frequency is not included in the frequency band of the wide-band residual signal generated by the wide-band residual signal generating means.

According to the present invention, there is also provided a sound synthesizing apparatus for synthesizing a wide-band signal from a part of an output signal acquired by a filtering synthesis whose input parameter is a linear prediction residual or excitation source of a narrow-band signal, the apparatus including means for analyzing the narrow-band signal to provide a linear prediction residual signal; means for adding to the linear prediction residual signal a noise signal having a signal component whose frequency is not included in the frequency band of the linear prediction residual signal generated by the analyzing means; and means for generating a wide-band residual signal from the linear prediction residual signal to which the noise signal has been added by the noise adding means.

According to the present invention, there is also provided a sound synthesizing method for synthesizing a wide-band signal from a part of an output signal acquired by a filtering synthesis whose input parameter is a linear prediction residual or excitation source of a narrow-band signal, the method including a step of adding a noise signal to the linear prediction residual or excitation source.

According to the present invention, there is also provided a sound synthesizing method for synthesizing a wide-band signal from a part of an output signal acquired by a filtering synthesis whose input parameter is a linear prediction residual or excitation source of a narrow-band signal, the method including steps of generating a wide-band excitation source from the linear prediction residual or excitation source and adding a noise signal to the wide-band excitation source.

According to the present invention, there is also provided a sound synthesizing method for synthesizing a wide-band signal from a part of an output signal acquired by a filtering synthesis whose input parameter is a linear prediction residual or excitation source of a narrow-band signal, the method including steps of the sound synthesizer including means for adding a noise signal to the linear prediction residual or excitation source, and generating a wide-band excitation source from the linear prediction residual or excitation source to which the noise signal has been added at the noise adding step.

According to the present invention, there is also provided a sound synthesizing method for synthesizing a wide-band signal from a part of an output signal acquired by a filtering synthesis whose input parameter is a linear prediction residual or excitation source of a narrow-band signal, the method including steps of analyzing the narrow-band signal to provide a linear prediction residual signal, generating a wide-band residual signal from the linear prediction residual acquired at the analyzing step, and adding to the wide-band residual signal a noise signal having a signal component whose frequency is not included in the frequency band of the wide-band residual signal generated by the wide-band residual signal generating means.

According to the present invention, there is also provided a sound synthesizing method for synthesizing a wide-band signal from a part of an output signal acquired by a filtering synthesis whose input parameter is a linear prediction residual or excitation source of a narrow-band signal, the method including steps of analyzing the narrow-band signal to provide a linear prediction residual signal, adding to the linear prediction residual signal a noise signal having a signal component whose frequency is not included in the frequency band of the linear prediction residual signal acquired at the analyzing step, and generating a wide-band residual signal from the linear prediction residual signal to which the noise signal has been added at the noise adding step.

With the sound synthesizing apparatus and method according to the present invention, it is possible to improve the quality of the excitation source and thus provide a quality wide-band signal.

According to the present invention, there is also provided a telephone apparatus including a transmitting means for transmitting parameters of a narrow-band signal encoded by the PSI-CELP or VSELP method as a transmission signal, and a receiving means for adding a noise signal to a linear prediction residual or excitation source included in the parameters and synthesizing a wide-band signal from a part of an output signal acquired by a filtering synthesis.

According to the present invention, there is also provided a telephone apparatus including a transmitting means for transmitting parameters of a narrow-band signal encoded by the PSI-CELP or VSELP method as a transmission signal, and a receiving means for generating a wide-band excitation source from a linear prediction residual or excitation source included in the parameters, adding a noise signal to the wide-band excitation source and then synthesizing a wide-band signal from a part of an output signal acquired by a filtering synthesis.

According to the present invention, there is also provided a telephone apparatus including a transmitting means for transmitting parameters of a narrow-band signal encoded by the PSI-CELP or VSELP method as a transmission signal, and a receiving means for adding a noise signal to a linear prediction residual or excitation source included in the parameters, generating a wide-band excitation source from the linear prediction residual or excitation source to which the noise signal has been added, and synthesizing a wide-band signal from a part of an output signal acquired by a filtering synthesis using the wide-band excitation source.

In the telephone apparatus according to the present invention, the receiving means can provide a quality wide-band signal.

According to the present invention, there is provided a program service medium for providing a sound synthesis program for synthesis of a wide-band signal from a part of an output signal acquired by a filtering synthesis whose input parameter is a linear prediction residual or excitation source of a narrow-band signal, the program including procedures of generating a wide-band excitation source from the linear prediction residual or excitation source, and adding a noise signal to the wide-band excitation source.

According to the present invention, there is provided a program service medium for providing a sound synthesis program for synthesis of a wide-band signal from a part of an output signal acquired by a filtering synthesis whose input parameter is a linear prediction residual or excitation source of a narrow-band signal, the program including procedures of adding a noise signal to the linear prediction residual or excitation source, and generating a wide-band excitation source from the linear prediction residual or excitation source to which the noise signal has been added in the noise adding procedure.

According to the present invention, there is provided a program service medium for providing a sound synthesis program for synthesis of a wide-band signal from a part of an output signal acquired by a filtering synthesis whose input parameter is a linear prediction residual or excitation source of a narrow-band signal, the program including procedures of analyzing the narrow-band signal to provide a linear prediction residual signal, generating a wide-band residual signal from the linear prediction residual signal acquired in the analyzing procedure, and adding to the wide-band residual signal a noise signal having a signal component whose frequency is not included in the frequency band of the wide-band residual signal generated in the wide-band residual signal generating procedure.

According to the present invention, there is provided a program service medium for providing a sound synthesis program for synthesis of a wide-band signal from a part of an output signal acquired by a filtering synthesis whose input parameter is a linear prediction residual or excitation source of a narrow-band signal, the program including procedures of analyzing the narrow-band signal to provide a linear prediction residual signal, adding to the residual signal a noise signal having a signal component whose frequency is not included in the frequency band of the linear prediction residual signal acquired in the analyzing procedure, and generating a wide-band residual signal from the linear prediction residual signal to which the noise signal has been added in the noise adding procedure.

The program service medium according to the present invention can provide a quality wide-band signal by serving the sound synthesizing method in the form of a program.

That is, a noise signal is intentionally added to a signal which would originally be an excitation source, in order to improve the quality of a synthesized signal.

More specifically, a noise signal whose gain has been adjusted with the power of a narrow-band excitation source and whose frequency ranges from 3,400 to 4,600 Hz, is generated separately, and added to a wide-band excitation source acquired by zero-filling. A resultant signal is taken as a wide-band excitation source. Alternately, a noise signal of 3,400 to 4,000 Hz is generated separately, added to a narrow-band excitation source, and then filled with zeros. A resulted signal is taken as a wide-band excitation source. Thus, the gap between the frequencies of 3,400 and 4,600 Hz can be eliminated.

In the aforementioned sound synthesizing apparatus and method, a linear predictive factor α and an excitation source or prediction residual exc are given, and the separately produced noise signal is added to the prediction residual exc. The resultant signal will be referred to as "exc" hereinafter. It is supplied to a synthesis filter in which with the linear predictive factor α taken as its filter factor, it is filtered to provide an output signal.

A filter factor αN used for synthesis of a narrow-band signal has the band thereof widened by any predictive means to provide a wide-band filter factor αW. The excitation source or prediction residual excN is made an aliased signal by zero-filling. The separately produced noise signal is added to the excitation source or prediction residual. The resulted signal will be referred to as "excW" hereinafter. Thereafter, the signal excW is supplied to the synthesis filter having the wide-band filter factor αW, where it is filtered to provide an output signal.

Also, the filter factor αN used for synthesis of a narrow-band signal is band-widened by any predictive means to provide a wide-band filter factor αW. The excitation source or prediction residual excN has the separately produced noise signal added thereto, and further is made an aliased signal by zero-filling. The resulted signal will be referred to as "excW" hereinafter. Thereafter, the signal excW is supplied to the synthesizing filter having the wide-band filter factor αW, where the signal is filtered to provide an output signal.

Also, an input narrow-band signal is subject to a linear predictive analysis or the like to provide a narrow-band factor αN. This narrow-band factor αN is reversely filtered to provide a prediction residual signal excN, and its frequency band is widened by any predictive means to provide a wide-band filter factor αW. The excitation source or prediction residual excN is made an aliased signal by zero-filling and has the separately produced noise signal added thereto. The resulted signal will be referred to as "excW" hereinafter. Thereafter, the signal excW is supplied to the synthesis filter taking the wide-band filter factor αW as its filter factor and in which the signal is filtered to provide an output signal.

Also, a narrow-band signal is subject to a linear predictive analysis or the like to provide a narrow-band factor αN. This narrow-band factor αN is reversely filtered to provide a prediction residual signal excN, and is band-widened by any predictive means to provide a wide-band filter factor αW. The excitation source or prediction residual excN has the separately produced noise signal added thereto and is made a signal which is aliased by zero-filling. The resulted signal will be referred to as "excW" hereinafter. Then, the signal excW is supplied to the synthesizing filter taking the wide-band filter factor αW as its filter factor and in which the signal is filtered to provide an output signal.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The present invention will further be described hereinbelow concerning some embodiments of the sound synthesizer implementing the sound synthesizing method of synthesizing, by adding a noise signal to a narrow-band sound signal, a wide-band signal from a part of a wide-band sound signal synthesized by a filter using parameters for the narrow-band sound signal.

Figure 1:
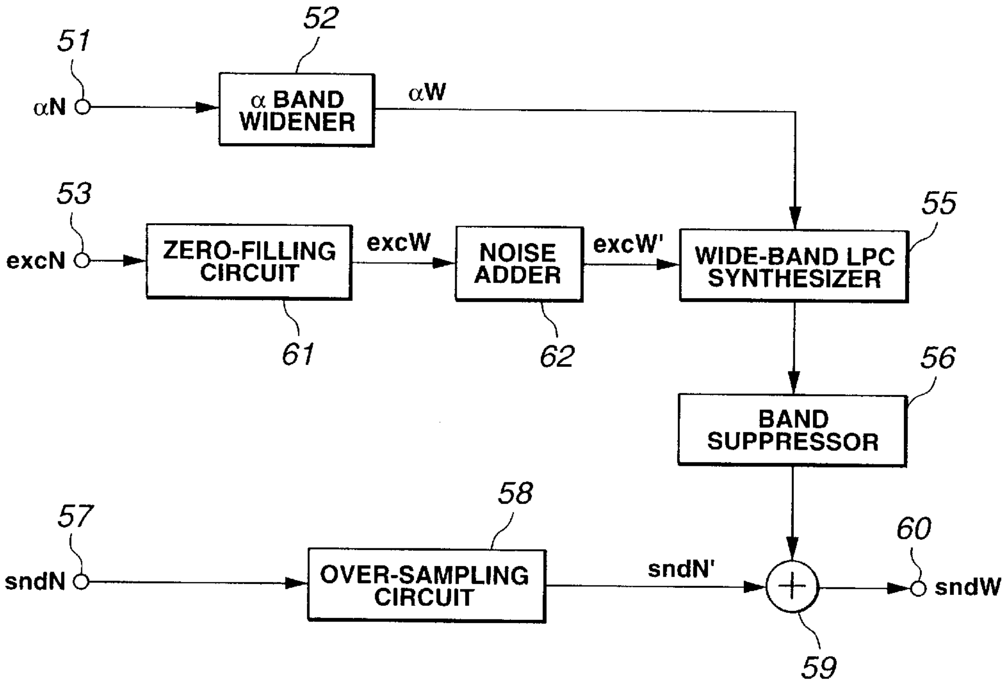
FIG. 1 is a block diagram of a first embodiment of the sound synthesizer according to the present invention.

Referring now to FIG. 1, there is schematically illustrated in the form of a block diagram the first embodiment of the sound synthesizer according to the present invention. As shown, the sound synthesizer is supplied at input terminals 57, 51 and 53 thereof with a narrow-band sound signal sndN whose frequency band is 300 to 3,400 Hz and sampling frequency is 8 kHz, a linear predictive factor αN used for synthesis of the narrow-band sound signal sndN, and an excitation source excN, respectively.

The linear predictive factor αN and excitation source excN are parameters related to the narrow-band sound signal sndN. Note however that all the parameters and input signal are not independent but the linear predictive factor αN and excitation source excN can be acquired by a linear predictive analysis of the narrow-band sound signal sndN. Precisely, the excitation source excN in this case is a linear prediction residual. Alternately, the narrow-band sound signal sndN can be acquired by a filtering synthesis from the linear predictive factor αN and excitation source excN. Further, the linear predictive factor αN and excitation source excN can be acquired by pre-processing the narrow-band sound signal and then by a linear predictive analysis of the pre-processed narrow-band sound signal. Also, the pre-processed narrow-band sound signal can be quantized to provide the linear predictive factor αN and excitation source excN. Similarly, the narrow-band sound signal sndN can be acquired by a filtering synthesis from the linear predictive factor αN and excitation source (linear prediction residual) excN and then by post-processing the synthesized signal to provide a narrow-band sound signal sndN.

As shown, the sound synthesizer includes a linear predictive factor (αN) band widener 52 to widen the frequency band of the linear predictive factor αN supplied from the input terminal 51, a zero-filling circuit 61 to widen the frequency band of the excitation source excN supplied from the input terminal 53, a noise adder 62 to add a noise signal to the band-widened excitation source αW from the zero-filling circuit 61, a wide-band LPC synthesizer 55 supplied with the wide-band excitation source excW' having the noise signal added thereto by the noise adder 62 to effect an LPC synthesis of a wide-band sound signal taking as a filter factor the wide-band linear predictive factor αW supplied from the linear predictive factor band widener 52, a band suppressor 56 to suppress the frequency band of the narrow-band sound signal in the synthesized output sound signal supplied from the wide-band LPC synthesizer 55, an over-sampling circuit 58 to change the sampling frequency of the narrow-band sound signal sndN supplied from the input terminal 57 to 16 kHz for the wide-band sound signal excW, an adder 59 to add together the narrow-band sound signal sndN' from the over-sampling circuit 58 and the output signal from the band suppressor 56, and an output terminal 60 at which a wide-band sound signal sndW is delivered.

The linear predictive factor (α)band widener 52 acquires from the linear predictive factor αN being a parameter representative of a narrow-band spectral envelope a wide-band linear predictive factor αW being a parameter indicative of a wider band spectral envelope. More particularly, the narrow-band linear predictive factor αN is converted to an autocorrelation γN, the autocorrelation γN is quantized using a code book for the narrow-band sound, the quantized data is dequantized using a code book for the wide-band sound to provide a wide-band autocorrelation γW, and the wide-band autocorrelation γW is converted to a wide-band linear predictive factor αW.

The zero-filling circuit 61 is provided to insert a zero value of n−1 between samples when the sampling frequency of the wide-band sound is n times higher than that of the narrow-band sound. Thus, the sampling frequency is adjusted and an aliased component takes place. Since the frequency characteristic of the excitation source is originally nearly flat, the aliased signal is also nearly flat and can be used as a wide-band excitation source excW.

However, when the narrow-band excitation source excN is not flat between 0 Hz and Nyquist frequency, the aliased signal is not flat in a corresponding range of frequency band. For example, if the narrow-band excitation source is limited to a range of 300 to 3,400 Hz and a zero is inserted at every other samples to double the sampling frequency, the frequency band of the wide-band excitation source excW ranges from 300 to 3,400 Hz and also from 4,600 to 7,700 Hz. Namely, there is a gap between the frequencies of 3,400 and 4,600 Hz. In this frequency gap, no quality sound can be assured.

To avoid the above, the noise adder 62 in the sound synthesizer in FIG. 1 generates a noise signal having a frequency band of 3,400 to 4,600 Hz, adjusts the gain of the noise signal, and adds the gain-adjusted noise to the excitation source excW after being filled with zeros by the zero-filling circuit 61. The wide-band excitation source excW' thus acquired is flatter. The signal is adjusted in gain by determining a narrow-band excitation source or a power of the wide-band excitation source after being filled with zeros, and fitting the gain to the narrow-band excitation source or the power. Alternately, when a codec (coder/decoder) is used, a gain by which a noise code book is multiplied is given as a parameter in advance, if any, may be used as it is or a value corresponding to the parameter may be acquired without acquisition of any power of the excitation source.

The wide-band LPC synthesizer 55 takes as a filter factor the wide-band linear predictive factor αW acquired by means of the linear predictive factor band widener 52 and receives the wide-band excitation source excW' from the noise adder 62, to synthesize a wide-band sound signal by a filtering synthesis.

The band suppressor 56 is provided to suppress the frequency band of the narrow-band sound signal being an original input signal to the sound synthesizer. This is intended for using the frequency band of the original narrow-band sound signal as it is since the signal provided by the wide-band LPC synthesizer 55 incurs a distortion.

The over-sampling circuit 58 fits the sampling frequency to that of the wide-band sound signal.

The adder 59 is provided to add together the signal from the band suppressor 56 and the signal from the over-sampling circuit 58. Since these signals are different in frequency band from each other, they are added together to provide a wide-band sound signal output sndW.

The first embodiment of the sound synthesizer, constructed as having been described in the foregoing, functions as will be described below:

When the sound synthesizer is supplied with the linear predictive factor αN from the input terminal 51, narrow-band excitation source excN from the input terminal 53 and the narrow-band sound signal sndN from the input terminal 57, first the linear predictive factor (α)band widener 52 widens the frequency band of the narrow-band linear predictive factor αN to provide the wide-band linear predictive factor αW. On the other hand, the narrow-band excitation source excN is band-widened by first filling the excitation source excN with zeros by the zero-filling circuit 61, and then adding the noise signal generated by the noised adder 62 to the zero-filled excitation source excN to provide a quality wide-band excitation source excW. These signals are used in the wide-band LPC synthesizer 55 to provide a first wide-band sound signal.

Next, the frequency band of the narrow-band sound in the first wide-band sound signal is suppressed by the band suppressor 56 to provide a second wide-band sound signal. On the other hand, the narrow-band sound signal sndN is over-sampled by the over-sampling circuit 58 to the sampling frequency of the wide-band sound signal, and has the second wide-band sound signal added thereto by the adder 59 to provide a final wide-band sound signal sndW at the output terminal 60.

Accordingly, in this first embodiment, the quality of the excitation source is improved to provide a quality wide-band signal.

Note that the band suppressor 56 may not be a one to strictly suppress only the frequency band of the narrow-band sound but may be for example a high-pass filter which will suppress all the low frequency bands. Also it should be noted that the first or second wide-band sound signal may be multiplied by a gain or the frequency characteristic may be changed by filtering.

Figure 2:
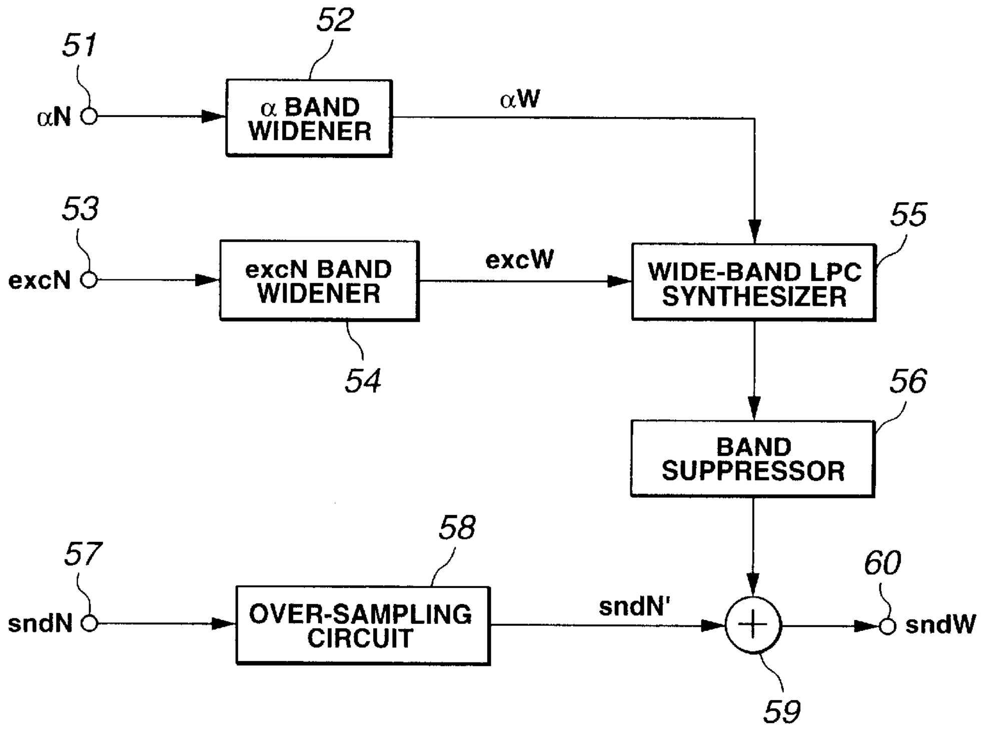
FIG. 2 is a block diagram of a conventional sound synthesizer illustrated and described herein for making clear the distinctions of the sound synthesizer in FIG. 1 from the prior art.

Referring now to FIG. 2, there is shown a conventional sound synthesizer intended for the purpose of comparison with the present invention. The conventional sound synthesizer is identical to the sound synthesizer shown in FIG. 1 except for the processing system for the narrow-band excitation source excN. In the conventional sound synthesizer shown in FIG. 2, an excitation source band widener (exc band widener) 54 is provided to widen the frequency band of the narrow-band excitation source excN.

The excitation source (exc) band widener 54 is adapted to fit the sampling frequency of the narrow-band sound signal to that of the wide-band sound signal when these sound signals are different in sampling frequency from each other, and then provide a wide-band excitation source excW having a wider frequency band than the narrow-band excitation source excN.

The conventional sound synthesizer shown in FIG. 2 functions as will be described below:

When the conventional sound synthesizer is supplied with the linear predictive factor αN from the input terminal 51, narrow-band excitation source excN from the input terminal 53 and the narrow-band sound signal sndN from the input terminal 57, first the linear predictive factor band widener 52 widens the frequency band of the narrow-band linear predictive factor αN to provide the wide-band linear predictive factor αW. On the other hand, the narrow-band excitation source excN is band-widened by the exc band widener 54. These signals are used in the wide-band LPC synthesizer 55 to provide a first wide-band sound signal.

Next, the frequency band of the narrow-band sound in the first wide-band sound signal is suppressed by the band suppressor 56 to provide a second wide-band sound signal. On the other hand, the narrow-band sound signal sndN is over-sampled by the over-sampling circuit 58 to the sampling frequency of the wide-band sound signal, and has the second wide-band sound signal added thereto by the adder 59 to provide a final wide-band sound signal sndW at the output terminal 60.

However, on the assumption that the sampling frequency of a narrow-band signal is 8 kHz, that of a wide-band signal is 16 kHz and a narrow-band excitation source is limited to 300 to 3,400 Hz, for example, the wide-band excitation source excW acquired by means of the excitation source (exc) band widener 54 will be of 300 to 3,400 Hz and 4,600 to 7,700 Hz with a frequency gap between 3,400 and 4,600 Hz. Thus, the frequency band corresponding to this gap will not be generated even with the wide-band LPC analysis by the wide-band LPC synthesizer 55 but a wide-band sound not containing a frequency band corresponding to the gap will be generated. The wide-band sound is not any natural sound.

To avoid the above in the first embodiment of the sound synthesizer in FIG. 1, a noise signal is intentionally added to a signal which would originally be an excitation source, to improve the quality of a synthesized signal.

More specifically, after the narrow-band excitation source excN is filled with zeros and band-widened, the noise signal is added to the band-widened narrow-band excitation source excN to provide a synthetic wide-band sound signal. Especially, a noise signal whose gain has been adjusted with the power of a narrow-band excitation source and whose frequency ranges from 3,400 to 4,600 Hz, is generated separately, and added to a wide-band excitation source acquired by zero-filling. A resulted signal is taken as a wide-band excitation source.

Figure 3:
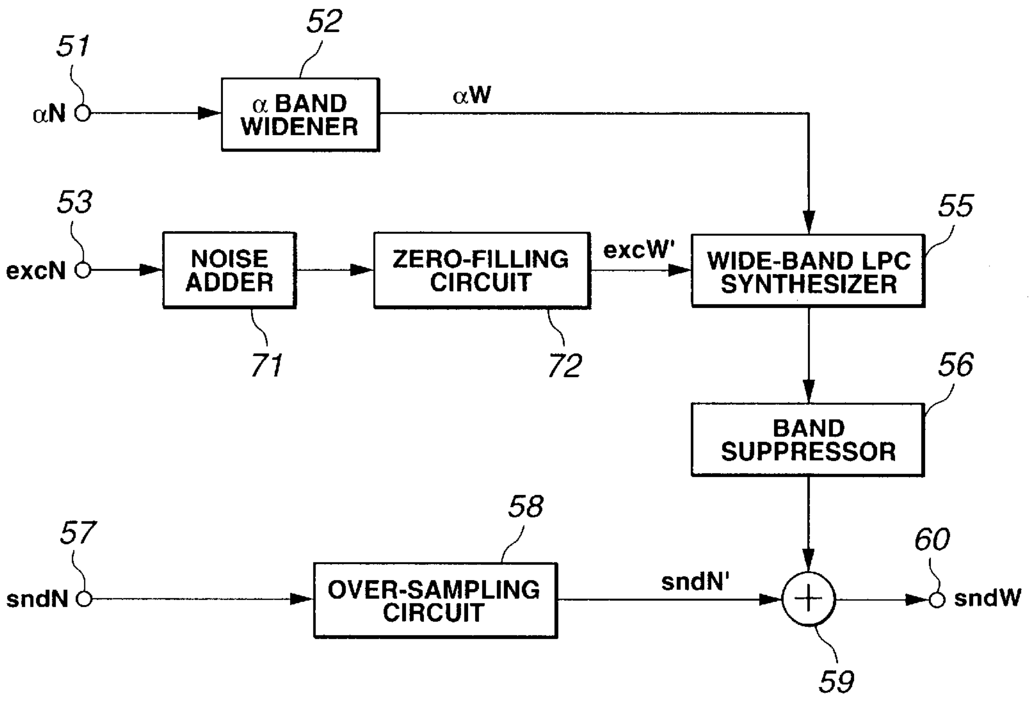
FIG. 3 is a block diagram of a second embodiment of the sound synthesizer according to the present invention.

Referring now to FIG. 3, there is illustrated in the form of a schematic block diagram the second embodiment of the sound synthesizer according to the present invention. The sound synthesizer in FIG. 3 is also supplied at input terminals 57, 51 and 53 thereof with a narrow-band sound signal sndN whose frequency falls within a band of 300 to 3,400 Hz and sampling frequency is 8 kHz, a linear predictive factor αN used for synthesis of the narrow-band sound signal sndN, and an excitation source excN, respectively.

The second embodiment is identical to the first embodiment in FIG. 1 except for the processing system for the narrow-band excitation source excN. Therefore the same or similar elements of the second embodiment as or to those in the first embodiment in FIG. 1 are indicated with the same or similar references and will not further be described.

More specifically, a noise signal of 3,400 to 4,000 Hz is generated separately by a noise adder 71 and added to the narrow-band excitation source excN, and then the noise-added excitation source excN is filled with zeros by a zero-filling circuit 72 to provide a wide-band excitation source excW. That is, the noise signal is added to the narrow-band excitation source excN, and then the wide-band excitation source excW is acquired to provide a wide-band sound signal.

The frequency characteristic of the narrow-band excitation source excN is nearly flat. However, when the narrow-band excitation source excN is not flat between 0 Hz and Nyquist frequency, the excitation source excW band-widened by the zero-filling circuit 72 is not flat. For example, if the narrow-band excitation source is limited to a range of 300 to 3,400 Hz and a zero is inserted at every other samples to double the sampling frequency, the wide-band excitation source excW ranges in frequency band from 300 to 3,400 Hz and from 4,600 to 7,700 Hz. Namely, there is a gap between the frequencies of 3,400 and 4,600 Hz. No quality sound can be acquired from a wide-band excitation source corresponding to this frequency gap.

To avoid the above, the noise adder 71 in the sound synthesizer in FIG. 3 generates a noise signal having a frequency band of 3,400 to 4,000 Hz, adjusts the gain of the noise signal, and adds the gain-adjusted noise to the excitation source excN. The signal gain is adjusted by determining a power of the narrow-band excitation and fitting the gain to the narrow-band excitation source power. Alternately, when a codec is used, a gain by which a noise code book is multiplied is given as a parameter in advance, if any, may be used as it is or a value corresponding to the parameter may be acquired without acquisition of any power of the excitation source.

The zero-filling circuit 72 is provided to insert a zero value of n−1 between two successive samples when the sampling frequency of the wide-band sound is n times higher than that of the narrow-band sound. Thus, the sampling frequency is adjusted and an aliased component takes place. The frequency characteristic of the noise-added excitation source is originally nearly flat, the aliased signal is also flatter than the original signal. Therefore, the aliased signal is also nearly flat and can be used as a quality wide-band excitation source.

The second embodiment of the sound synthesizer, constructed as having been described in the foregoing, functions as will be described below:

When the sound synthesizer is supplied with the linear predictive factor αN from the input terminal 51, narrow-band excitation source excN from the input terminal 53 and the narrow-band sound signal sndN from the input terminal 57, first the frequency band of the narrow-band linear predictive factor αN is widened to provide the wide-band linear predictive factor αW. On the other hand, the narrow-band excitation source excN is band-widened by first adding the noise signal generated by the noised adder 71 to the band-widened excitation source excN and then filling the noise-added signal with zeros by the zero-filling circuit 72 to provide a quality wide-band excitation source excW. These signals are used in the wide-band LPC synthesizer 55 to provide a first wide-band sound signal. Then, the frequency band of the narrow-band sound in the first wide-band sound signal is suppressed to provide a second wide-band sound signal. On the other hand, the narrow-band sound signal sndN is over-sampled by the over-sampling circuit 58 to the sampling frequency of the wide-band sound signal, and has the second wide-band sound signal added thereto by the adder 59 to provide a final wide-band sound signal sndW at the output terminal 60.

Also in this second embodiment, the quality of the excitation source is unproved to provide a quality wide-band signal.

Figure 4:
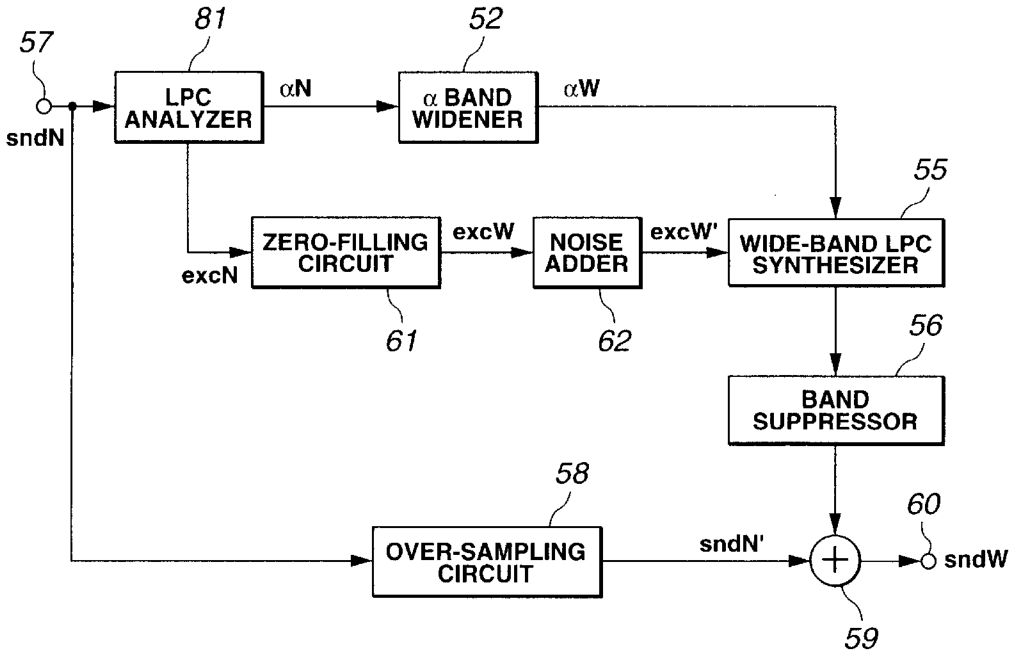
FIG. 4 is a block diagram of a third embodiment of the sound synthesizer according to the present invention.

Referring now to FIG. 4, there is schematically illustrated in the form of a block diagram a third embodiment of the sound synthesizer according to the present invention. The sound synthesizer in FIG. 4 is also supplied at the input terminal 57 thereof with only a narrow-band sound signal sndN whose frequency falls within a band of 300 to 3,400 Hz and sampling frequency is 8 kHz.

The third embodiment is identical to the first embodiment in FIG. 1 provided that an LPC analyzer 81 is provided to acquire the linear predictive factor αN and narrow-band excitation source excN. Therefore the same or similar elements of the third embodiment as or to those in the first embodiment in FIG. 1 are indicated with the same or similar references and will not further be described.

The LPC analyzer 81 is provided for linear predictive analysis of the narrow-band sound sndN supplied from the input terminal 57 to provide a linear predictive factor αN and a linear prediction residual excN resulted from a reverse filtering using the linear predictive factor αN.

More specifically, the linear predictive factor αN and linear prediction residual excN provided from the LPC analyzer 81 are shaped directly or after being post-processed in some manner, and used as the linear predictive factor αN and excitation source excN in the first embodiment in FIG. 1 to widen the frequency band of a sound.

The third embodiment of the sound synthesizer, constructed as having been described in the foregoing, functions as will be described below:

When the sound synthesizer is supplied with the narrow-band sound signal sndN from the input terminal 57, the LPC analyzer 81 makes a linear predictive analysis of the sound signal sndN to provide the narrow-band linear predictive factor αN and narrow-band linear prediction residual excN. The frequency band of the narrow-band linear predictive factor αN is widened by the narrow-band linear predictive factor (α) band widener 52 to provide the wide-band linear predictive factor αW. On the other hand, the narrow-band excitation source excN is band-widened by first filling the narrow-band excitation source excN with zeros by the zero-filling circuit 61 and adding the noise signal generated by the noised adder 62 to the zero-filled narrow-band excitation source excN to provide a quality wide-band excitation source excW'. These signals are used in the wide-band LPC synthesizer 55 to provide a first wide-band sound signal. Then, the frequency band of the narrow-band sound in the first wide-band sound signal is suppressed to provide a second wide-band sound signal. On the other hand, the narrow-band sound signal sndN is over-sampled by the over-sampling circuit 58 to the sampling frequency of the wide-band sound signal, and has the second wide-band sound signal added thereto by the adder 59 to provide a final wide-band sound signal sndW at the output terminal 60.

Also in this third embodiment, the quality of the excitation source is improved to provide a quality wide-band signal.

Figure 5:
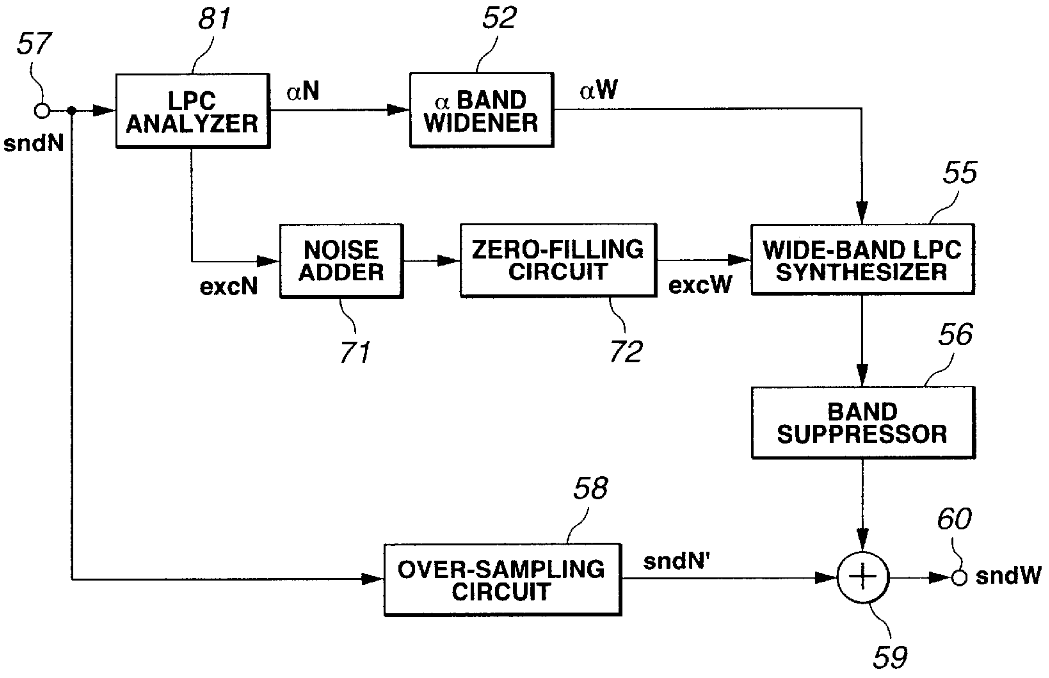
FIG. 5 is a block diagram of a fourth embodiment of the sound synthesizer according to the present invention.

Referring now to FIG. 5, there is schematically illustrated in the form of a block diagram a fourth embodiment of the sound synthesizer according to the present invention. The sound synthesizer in FIG. 5 is also supplied at the input terminal 57 thereof with only a narrow-band sound signal sndN whose frequency falls within a band of 300 to 3,400 Hz and sampling frequency is 8 kHz.

The fourth embodiment is identical to the third embodiment in FIG. 4 except for the processing system for the narrow-band excitation source excN acquired by means of an LPC analyzer 81. Therefore the same or similar elements of the fourth embodiment as or to those in the third embodiment in FIG. 1 are indicated with the same or similar references and will not further be described.

More specifically, a noise signal of 3,400 to 4,000 Hz is generated separately by the noise adder 71 and added to the linear predictive residual excN, and then the noise-added linear predictive residual excN is filled with zeros by the zero-filling circuit 72 to provide a wide-band excitation source excW. That is, the noise signal is added to the narrow-band linear predictive residual excN to provide the wide-band excitation source excW, thereby synthesizing a wide-band sound signal.

The fourth embodiment of the sound synthesizer, constructed as having been described in the foregoing, functions as will be described below:

When the sound synthesizer is supplied with the narrow-band sound signal sndN from the input terminal 57, the LPC analyzer 81 makes a linear predictive analysis of the sound signal sndN to provide the narrow-band linear predictive factor αN and narrow-band linear prediction residual excN. The band of the narrow-band linear predictive factor αN is widened by the narrow-band linear predictive factor band widener (α band widener) 52 to provide the wide-band linear predictive factor αW. On the other hand, the narrow-band excitation source excN is band-widened by first adding the noise signal generated by the noise adder 71 to the narrow-band excitation source excN and then filling the noise-added narrow-band excitation source excN with zeros by the zero-filling circuit 72 to provide a quality wide-band excitation source excW'. These signals are used in the wide-band LPC synthesizer 55 to provide a first wide-band sound signal. Then, the frequency band of the narrow-band sound in the first wide-band sound signal is suppressed to provide a second wide-band sound signal. On the other hand, the narrow-band sound signal sndN is over-sampled by the over-sampling circuit 58 to the sampling frequency of the wide-band sound signal, and has the second wide-band sound signal added thereto by the adder 59 to provide a final wide-band sound signal sndW at the output terminal 60.

Also in this fourth embodiment, the quality of the excitation source is improved to provide a quality wide-band signal.

Figure 6:
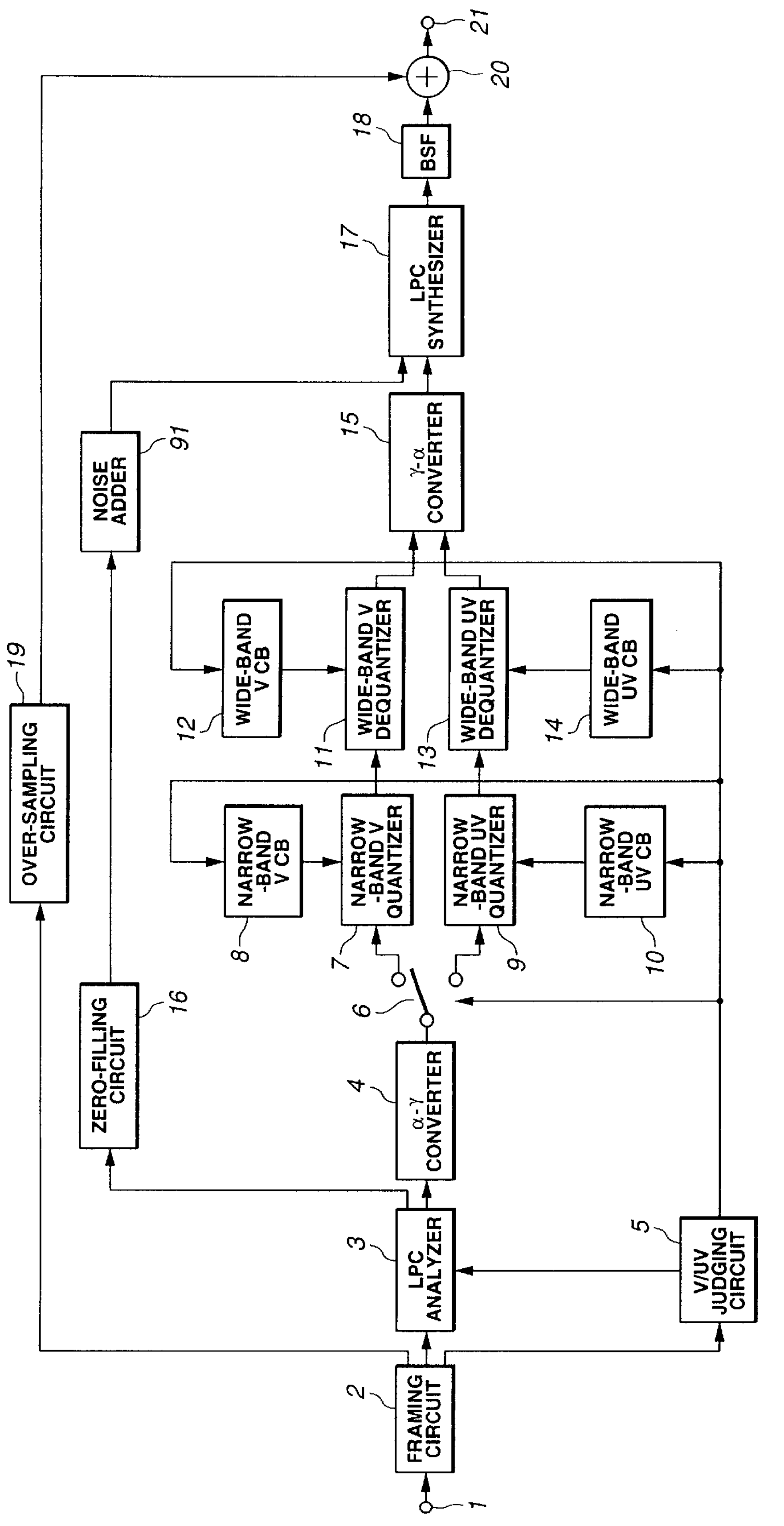
FIG. 6 is a block diagram of a fifth embodiment of the sound synthesizer according to the present invention.

Referring now to FIG. 6, there is schematically illustrated in the form of a block diagram a fifth embodiment of the sound synthesizer according to the present invention. The sound synthesizer in FIG. 6 is also supplied at the input terminal 1 thereof with only a narrow-band sound signal sndN whose frequency falls within a band of 300 to 3,400 Hz and sampling frequency is 8 kHz.

The fifth embodiment of the sound synthesizer includes a wide-band voiced sound code book 12 and wide-band unvoiced sound code book 14, created in advance based on voiced and unvoiced sound parameters, respectively, extracted from wide-band voiced and unvoiced sounds, respectively, and a narrow-band voiced sound code book 7 and narrow-band unvoiced sound code book 10, created in advanced based on voiced and unvoiced sound parameters, respectively, extracted from a narrow-band voiced sound signal acquired by limiting the frequency band of the wide-band sound and having a frequency of 300 to 3,400 Hz.

The fifth embodiment of the sound synthesizer also includes a framing circuit 2 to frame the narrow-band sound signal received at the input terminal 1 at every 160 samples (one frame lasts for 20 msec since the sampling frequency is 8 kHz), a zero-filling circuit 16 to form an excitation source based on the narrow-band sound signal framed by the framing circuit 2, a noise adder 91 to add a noise signal to the excitation source from the zero-filling circuit 16, a U/UV judging circuit 5 to determine whether the input narrow-band signal is a voiced sound (V) or an unvoiced sound (UV) at each frame of 20 msec, an LPC analyzer (linear predictive coding) 3 to provide a linear predictive factors α for narrow-band voiced sound or unvoiced sound based on the result of V/UV determination from the U/UV judging circuit 5, a linear predictive factor/autocorrelation (α→γ) converter 4 to convert the linear predictive factor α from the LPC analyzer 3 to an autocorrelation γ being a kind of parameter, a narrow-band voiced sound quantizer 7 to quantize the narrow-band voiced sound autocorrelation from the α→γ converter 4 using the narrow-band voiced sound code book 8, a narrow-band unvoiced sound quantizer 9 to quantize the narrow-band unvoiced autocorrelation from the α→γ converter 4 using the narrow-band unvoiced sound code book 10, a wide-band voiced sound dequantizer 11 to dequantize the narrow-band voiced sound quantized data from the narrow-band voiced sound quantizer 7 using the wide-band voiced sound code book 12, a wide-band unvoiced sound dequantizer 13 to dequantize the narrow-band unvoiced sound quantized data from the narrow-band unvoiced sound quantizer 9 using the wide-band unvoiced sound code book 14, an autocorrelation/linear predictive factor (γ→α) converter 15 to convert a wide-band voiced sound autocorrelation being the dequantized data from the wide-band voiced sound dequantizer 11 to a wide-band voiced sound linear predictive factor while converting a wide-band unvoiced sound autocorrelation being the dequantized data from the wide-band unvoiced sound dequantizer 13 to a wide-band unvoiced sound linear predictive factor, and an LPC synthesizer 17 to synthesize a wide-band sound based on the wide-band voiced and unvoiced sound linear predictive factors from the converter 15 and the excitation source to which the noise signal has been added by the noise adder 91.

The sound synthesizer further includes an over-sampling circuit 19 to over-sample the sampling frequency of the narrow-band sound framed by the framing circuit 2 from 8 kHz to 16 kHz, a band-stop filter (BSF) 18 to remove from the synthetic output from the LPC synthesizer 17 a signal component of 300 to 3,400 Hz in the input narrow-band sound signal, and an adder 20 to add to the output from the BSF 18 the original narrow-band sound signal supplied from the over-sampling circuit 19 and whose sampling frequency is 16 kHz and frequency band is 300 to 3,400 Hz. The sound synthesizer delivers at an output terminal 21 thereof a digital sound signal whose frequency band is 300 to 7,000 Hz and sampling frequency is 16 kHz.

How to create the wide-band voiced sound code book 12 and wide-band unvoiced sound code book 14, and the narrow-band voiced sound code book 8 and narrow-band unvoiced sound code book 10 will be described herebelow:

The wide-band voiced sound code book 12 and wide-band unvoiced sound code book 14 are created using voiced and unvoiced sound parameters extracted from wide-band voiced and unvoiced sounds (V and UV), respectively, in a wide-band sound signal having a frequency band of 300 to 7,000 Hz, for example, framed at every 20 msec as in the framing by the framing circuit 2.

The narrow-band voiced sound code book 7 and wide-band unvoiced sound code book 10 are created using voiced and unvoiced sound parameters extracted from a narrow-band sound signal whose frequency band falls within a range of 300 to 3,400 Hz, for example, acquired by limiting the frequency band of the above wide-band sound.

Figure 7:
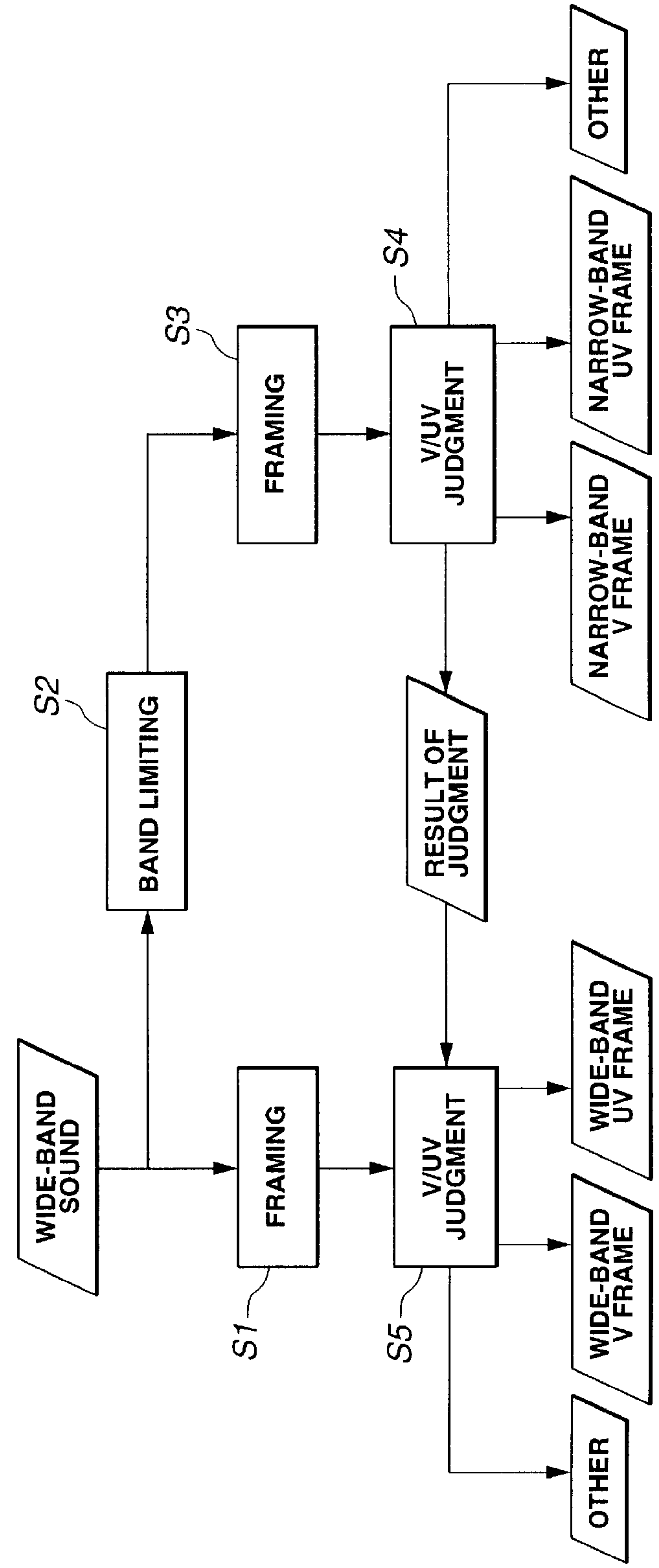
FIG. 7 is a flow chart of operations effected to generate data for creation of code books used in the fifth embodiment of the sound synthesizer in FIG. 6.

Referring now to FIG. 7, there is shown a flow chart of operations effected in producing learning data for creation of the above four code books. As shown, a wide-band learning sound signal is created, and framed at every 20 msec at step S1. The frequency band of the wide-band learning sound signal is limited at step S2 to provide a narrow-band sound signal. At step S3, this narrow-band signal is also framed at the same timing as in the framing at step S1. Then in each frame of narrow-band sound, values of frame energy, zero-cross, etc. are examined to judge whether the narrow-band sound is a voiced (V) or unvoiced (UV) sound at step S4.

For a quality code book, only sounds which are positively V and those which are surely UV are taken while sounds in transition from V to UV vice versa and those not easily determinable to be V or UV are excluded. Thus, a narrow-band learning V frames list and a narrow-band learning UV frames list are acquired.

Also the wide-band sound signal frames are classified into V and UV lists. As in the above, the narrow-band sound signal has been framed at the same timing as the wide-band sound signal. The wide-band frames acquired at the same time as the narrow-band V frames are taken as the wide-band V frames while those acquired at the same time as the narrow-band UV frames are taken as the wide-band UV frames. Thus, learning data are produced. Of course, the wide-band frames corresponding to the narrow-band frames having been classified into neither V nor UV frames are excluded.

Also, the learning data may be acquired by reversely following the above procedure (not shown). That is, the wide-band frames are first classified into V and UV ones, and then the narrow-band frames are classified into V and UV ones.

Figure 8:
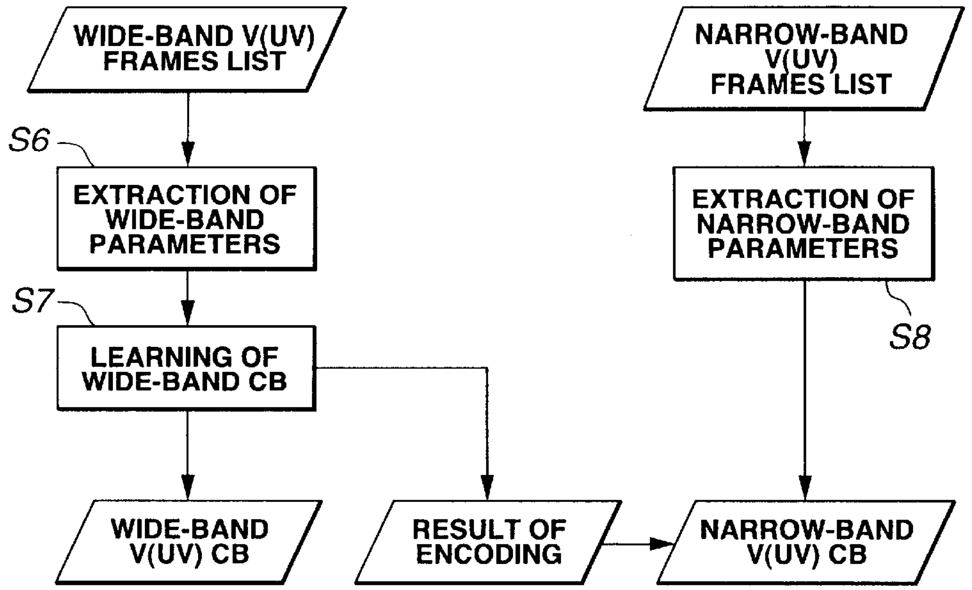
FIG. 8 is a flow chart of operations effected to create the code books used in the fifth embodiment of the sound synthesizer in FIG. 6.

Next, the learning data are used to create the code books as shown in FIG. 8 showing a flow chart of operations effected to create the code books used in the fifth embodiment of the sound synthesizer in FIG. 8. As shown, first the wide-band V (or UV) frames list is used to learn and generate a wide-band V (UV) code book.

First at step S6, up to dn-the order autocorrelation parameters are extracted from each wide-band frame. Each of the autocorrelation parameters is computed using the following formula (1):

$$\phi(x_i)=\frac{\sum_{j=0}^{N-j-1} x_j x_j+1}{\sum_{j=0}^{N-1} x_j^2}. \tag{1}$$

where x is an input signal, Φ(xi) is an i-th order autocorrelation and N is a frame length.

At step S7, a dw-the order, sw-sized wide-band V (UV) code book is made by the GLA (General Lloyd Algorithm) from the dw-the order autocorrelation in each wide-band frame.

Next, it is examined based on the encoding result to which code vector of the code book thus made the autocorrelation parameter of each wide-band V (UV) frame are quantized. For each code vector, there is computed a center of gravity, for example, for dn-th order autocorrelation parameter acquired from the narrow-band V (UV) frame corresponding in time of framing to the wide-band V (UV) frame quantized to the code vector. The center of gravity is taken as a narrow-band code vector at step S8. By effecting this procedure for all code vectors, narrow-band code books are made.

Figure 9:
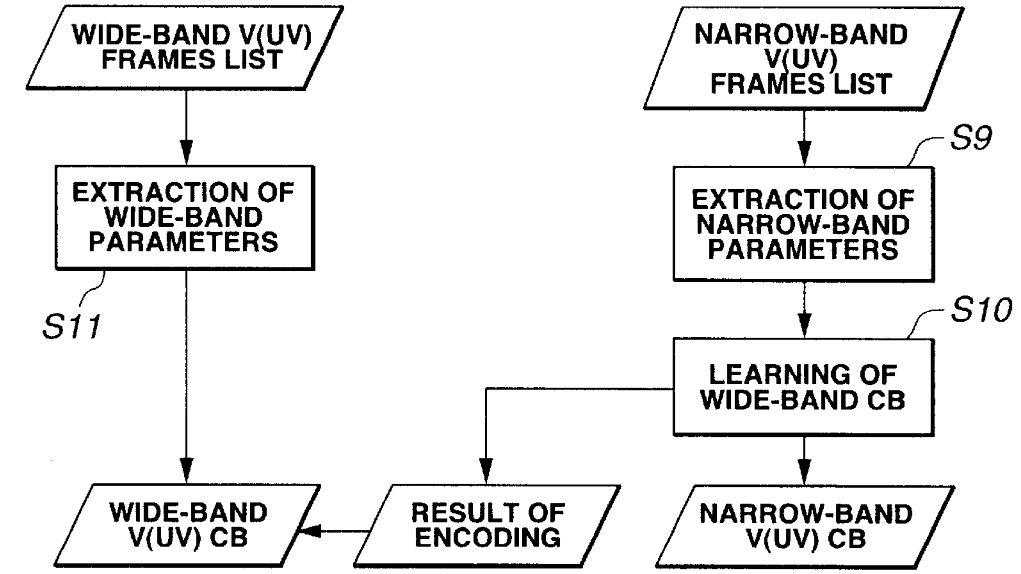
FIG. 9 is a flow chart of operations effected to otherwise create the code books used in the sound synthesizer in FIG. 6.

Note that the above procedure may reversely be done as shown in FIG. 9 showing a flow chart of operations effected to otherwise create the code books used in the sound synthesizer in FIG. 6. That is, a narrow-band code book is first learned and made at steps 9 and 10 using the narrow band frame parameter, and then the center of gravity of the wide-band frame parameter corresponding to the narrow-band frame parameter is determined at step S11.

Thus, the code books including the two narrow-band V and UV code books and two wide-band V and UV code books are made.

Figure 10:
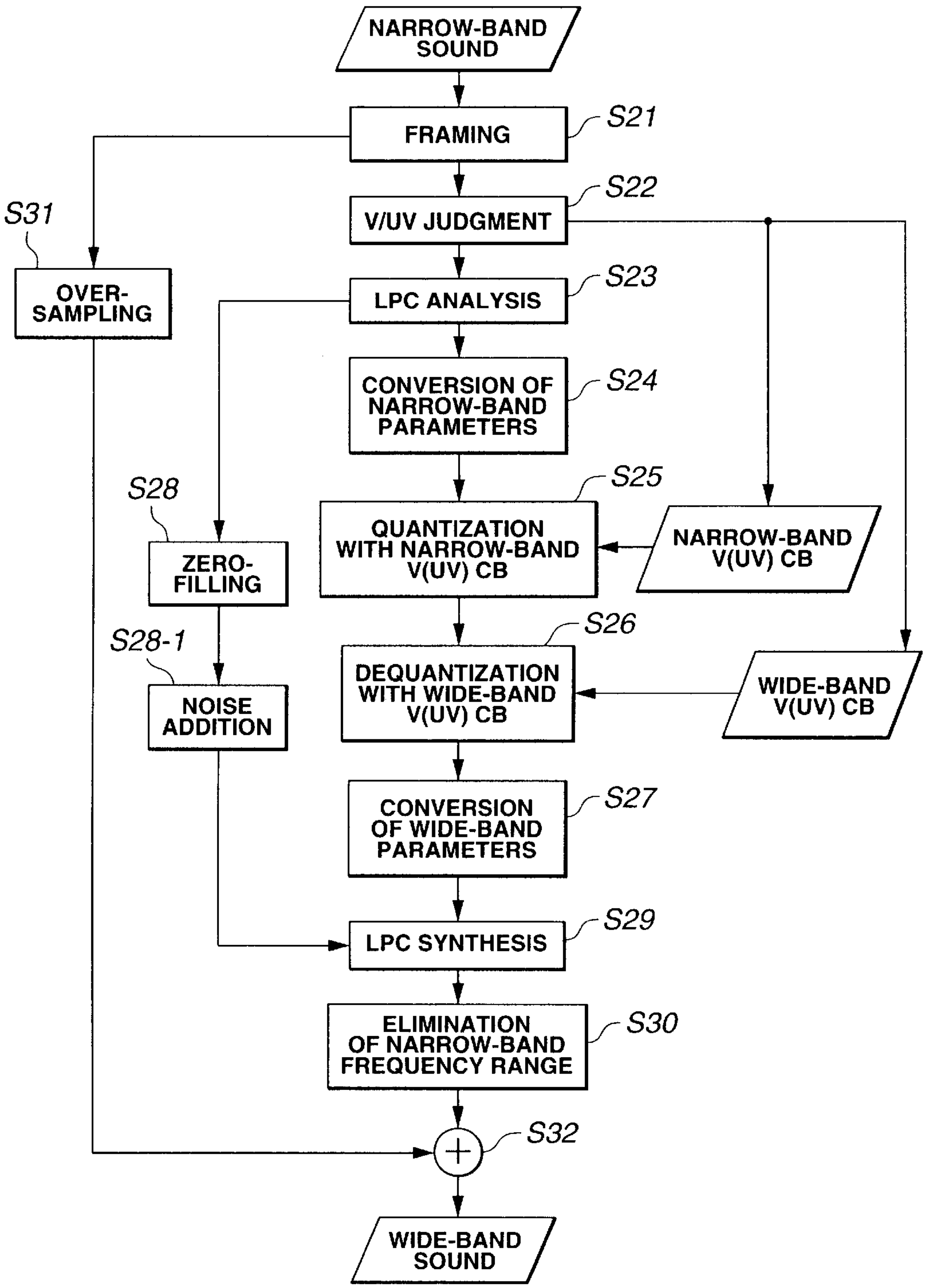
FIG. 10 is a flow chart of operations of the sound synthesizer in FIG. 6.

Referring now to FIG. 10, there is given a flow chart of operations of the sound synthesizer to which the sound synthesizing method according to the present invention is applied. As shown, the above code books are used to provide a wide-band sound signal when a narrow-band sound is entered to the sound synthesizer in practice.

First, the narrow-band sound signal supplied from the input terminal 1 is framed at every 160 samples (20 msec) by the framing circuit 2 at step S21. Each of the frames thus formed is subjected to LPC analysis by the LPC analyzer 3 at step S23 and thus divided into linear predictive factor (α) parameter and LPC residual. The α parameter is converted to an autocorrelation γ by the α→γ converter 4 at step S24.

It is judged by the V/UV judging circuit 5 at S22 whether the framed signal is judged to be V or UV. When it is determined to be V, a switch 6 to select a destination of the output from the α→γ converter 4 is connected to the narrow-band voiced sound quantizer 7. When it is determined to be UV, the switch 6 is connected to the narrow-band unvoiced sound quantizer 9.

Note that this U/V judgment is different from that effected for the code book generation in that the frame signal is always judged to be either V or UV. There remains no frame signal which is neither V nor UV. The UV signal has a larger energy when it has a frequency in the higher band. So, when a higher frequency band is predicted, a large energy will take place, which will lead to generation of a strange sound when a signal for which V/UV judgement is difficult is erroneously judged to be UV. To avoid this, a frame signal which could not be judged to be either V or UV during code book generation is judged to be V in practice.

When the V/UV judging circuit 5 has judged a framed signal to be V, the voiced sound autocorrelation γ from the switch 6 is supplied to the narrow-band V quantizer 7 and quantized using the narrow-band V code book 8 at step S25. On the other hand, when the V/UV judging circuit 5 has judged a framed signal to V, the unvoiced sound autocorrelation γ from the switch 6 is supplied to the narrow-band UV quantizer 9 where it is quantized using the narrow-band UV code book 10 at step S25.

Then at step S26, the quantized framed signal is dequantized by the wide-band V dequantizer 11 or wide-band UV dequantizer 13 using the wide-band V code book 12 or wide-band UV code book 14 to provide a wide-band autocorrelation.

The wide-band autocorrelation is converted to a wide-band linear predictive factor α by the γ→α converter 15 at step S27.

On the other hand, the LPC residual from the LPC analyzer 3 is filled with a zero between samples thereof by the zero-filling circuit 16 and thus up-sampled, and band-widened by aliasing, at step S28. At step S28-1, a noise signal is added to the wide-band excitation source by the noise adder 91 and then supplied to the LPC synthesizer 17.

At step S29, the wide-band linear predictive factor α and the noise-added wide-band excitation source are subjected to LPC synthesis in the LPC synthesizer 17 to provide a wide-band sound signal.

However, the wide-band sound signal itself is only a wide-band signal acquired by prediction, and contains a prediction-caused error. Especially so long as the frequency range of the input narrow-band sound is concerned, the input sound should be used as it is.

Therefore, the frequency range of the input narrow-band sound is filtered out by the BSF 18 at step S30. The narrow-band sound is over-sampled by the over-sampling circuit 19 at step S31. The input narrow-band sound and the over-sampled narrow-band sound are added together at step S32 to provide a band-widened sound signal. Note that for the above addition, the gain may be adjusted and the high frequency band is somewhat suppressed to improve the audibility of the sound.

The fifth embodiment is characterized in that in the noise adder 91, a noise signal having a frequency band of 3,400 to 4,600 Hz is generated, its gain is adjusted and the noise signal is added to the excitation source excW filled with zeros by the zero-filling circuit 16. The wide-band excitation source excW thus provided is flatter. The gain is adjusted by acquiring a power of the narrow-band excitation source or zero-filled excitation source, and fitting the gain to the power. Alternately, when a codec (coder/decoder) is used, a gain by which a noise code book is multiplied is given as a parameter in advance, if any, may be used as it is or a value corresponding to the parameter may be acquired without acquisition of any power of the excitation source.

As having been described in the foregoing, the sound synthesizer shown in FIG. 6 can provide a quality wide-band sound signal by improving the quality of the excitation source.

This sound synthesizer uses the autocorrelation parameters in the total of four code books but the present invention is not limited to the use of autocorrelation parameters. For example, LPC ceptsrum may effectively be used. For prediction of a ceptsrum envelope, the ceptsrum envelope may be taken as a parameter.

Also, the aforementioned sound synthesizer uses the narrow-band V code book 8 and narrow-band UV code book 10. However, these code books 8 and 10 may not be used. In this case, the RAM capacity can be reduced for the code books.

Figure 11:
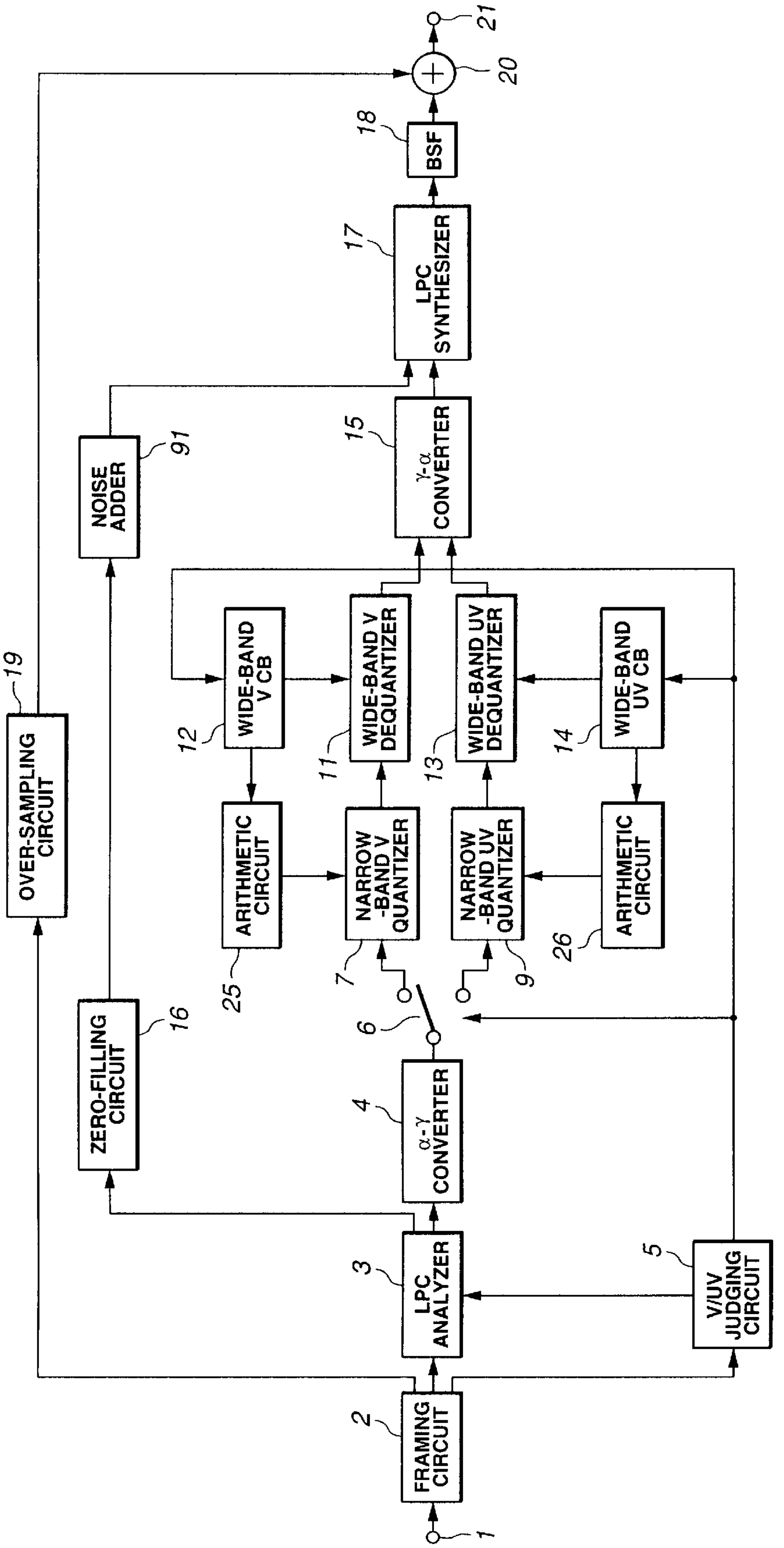
FIG. 11 is a block diagram of a variant of the sound synthesizer in FIG. 6, in which a reduced number of code books is used.

FIG. 11 shows the construction of the above variant of the sound synthesizer. As shown, this sound synthesizer uses, in place of the narrow-band V and UV code books 8 and 10, arithmetic circuits 25 and 26 to acquire narrow-band V and UV parameters by computing each code vector in the wide-band code book. In other respects, the sound synthesizer is similar to the sound synthesizer in FIG. 6.

When the parameters for use in the code book are autocorrelations, a relation exists between the wide- and narrow-band autocorrelations as given by the following formula (2):

$$\Phi(xn)=\Phi(xw \otimes h)=\Phi(xw) \otimes \Phi(h) \quad (2)$$

where Φ is an autocorrelation, xn is a narrow-band signal, xw is a wide-band signal and h is an impulse response of the band stop filter (BSF).

Thus, a narrow-band autocorrelation Φ(xn) can be computed from a wide-band autocorrelation Φ(xw). Therefore, only either of the wide- and narrow-band vectors is necessary.

That is, a narrow-band autocorrelation can be acquired by convolution of a wide-band autocorrelation and an autocorrelation of the impulse response of BSF.

Figure 12:
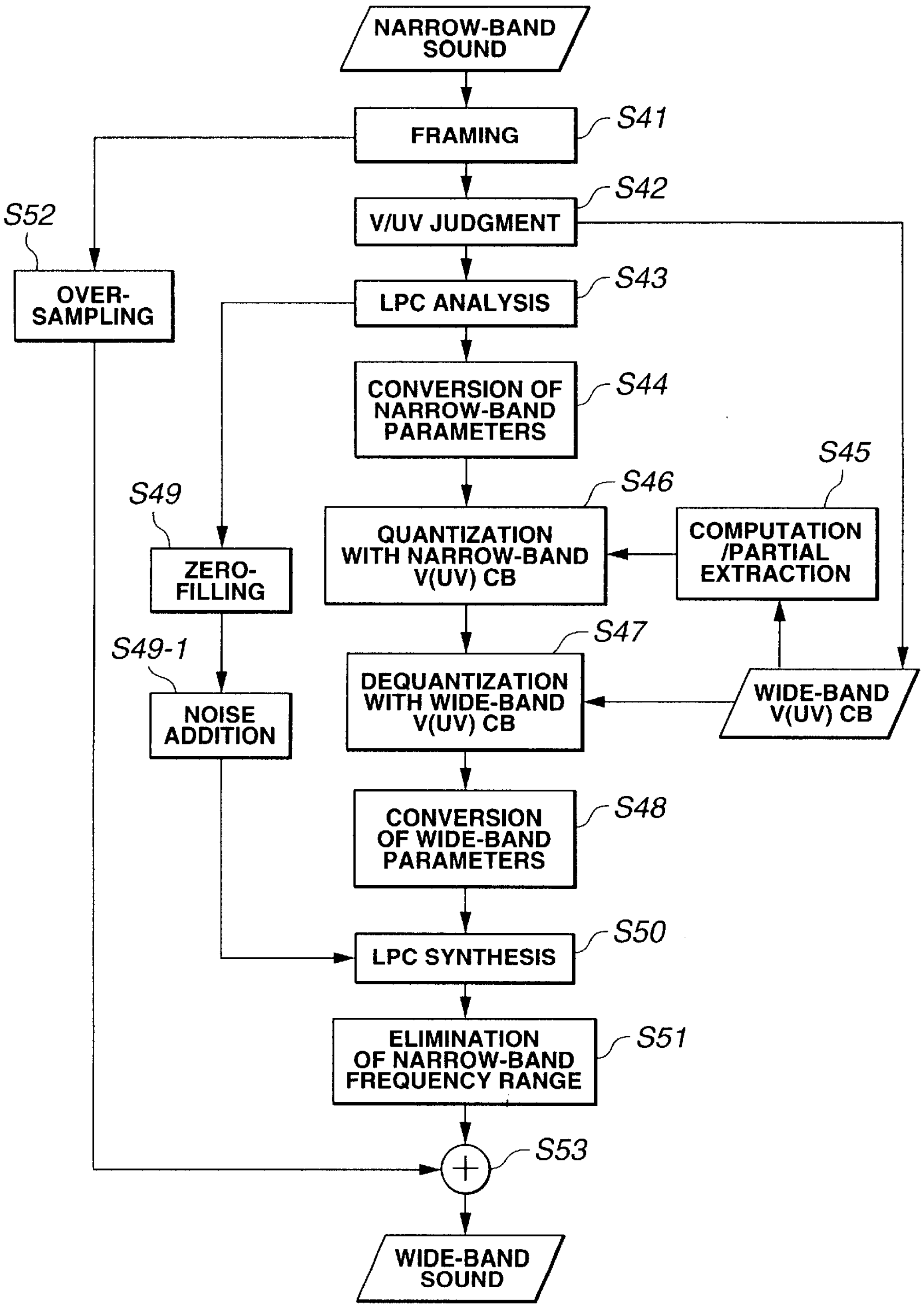
FIG. 12 is a flow chart of operations of the variant of the sound synthesizer in FIG. 11.

Therefore, this sound synthesizer can operate as in FIG. 12, not as in FIG. 10. Particularly, the narrow-band sound signal supplied from the input terminal 1 is first framed at every 160 samples (20 msec) by the framing circuit 2 at step S41.

Each of the frames thus formed is subjected to LPC analysis by the LPC analyzer 3 at step S43 and thus divided into linear predictive factor (α) parameter and LPC residual. The α parameter is converted to an autocorrelation γ by the α→γ converter 4 at step S44.

It is judged by the V/UV judging circuit 5 at step S42 whether the framed signal is judged to be V or UV. When it is determined to be V, the switch 6 to select a destination of the output from the α→γ converter 4 is connected to the narrow-band voiced sound quantizer 7. When it is determined to be UV, the switch 6 is connected to the narrow-band unvoiced sound quantizer 9.

Note that this V/UV judgement is different from that effected for the code book generation in that the frame signal is always judged to be either V or UV.

When the V/UV judging circuit 5 has judged a framed signal to be V, the voiced sound autocorrelation γ from the switch 6 is supplied to the narrow-band V quantizer 7 where it is quantized, at step S46. For this quantization, however, not the narrow-band code book but the narrow-band V parameter acquired by the arithmetic circuit 25 at step S45 is used.

On the other hand, when the V/UV judging circuit 5 has judged a framed signal to V, the unvoiced sound autocorrelation γ from the switch 6 is supplied to and quantized by the narrow-band UV quantizer 9 at step S46. At this time as well, not the narrow-band UV code book but the narrow-band UV parameter acquired by the arithmetic circuit 26 is used for this quantization.

Then at step S47, the quantized framed signal is dequantized by the wide-band V dequantizer 11 or wide-band UV dequantizer 13 using the wide-band V code book 12 or wide-band UV code book 14, respectively, to provide a wide-band autocorrelation.

The wide-band autocorrelation is converted to a wide-band linear predictive factor α by the γ→α converter 15 at step S48.

On the other hand, the LPC residual from the LPC analyzer 3 is filled with a zero between two successive samples by the zero-filling circuit 16 and thus up-sampled, and band-widened by aliasing, at step S49. At step S49-1, a noise signal is added to the wide-band excitation source by the noise adder 91 and then supplied to the LPC synthesizer 17.

At step S50, the wide-band linear predictive factor α and the noise-added wide-band excitation source are subjected to LPC synthesis in the LPC synthesizer 17 to provide a wide-band sound signal.

However, the wide-band sound signal itself is only a wide-band signal acquired by prediction and contains a prediction-caused error. Especially so long as the frequency range of the input narrow-band sound is concerned, the input sound should be used as it is.

Therefore, the frequency range of the input narrow-band sound is filtered out by the BSF 18 at step S51. The narrow-band sound is over-sampled by the over-sampling circuit 19 at step S52. The input narrow-band sound and the over-sampled narrow-band sound are added together at step S53.

In the sound synthesizer shown in FIG. 11, the quantization is done not by comparison with the code vector of the narrow-band code books but by comparison with a code vector acquired by a computation using the wide-band code books. Thus, the wide-band code books can be used for both the analysis and synthesis, so the memory for holding the narrow-band code books becomes unnecessary. Of course, this sound synthesizer can also provide a quality wide-band sound signal by improving the quality of the excitation source.

Figure 13:
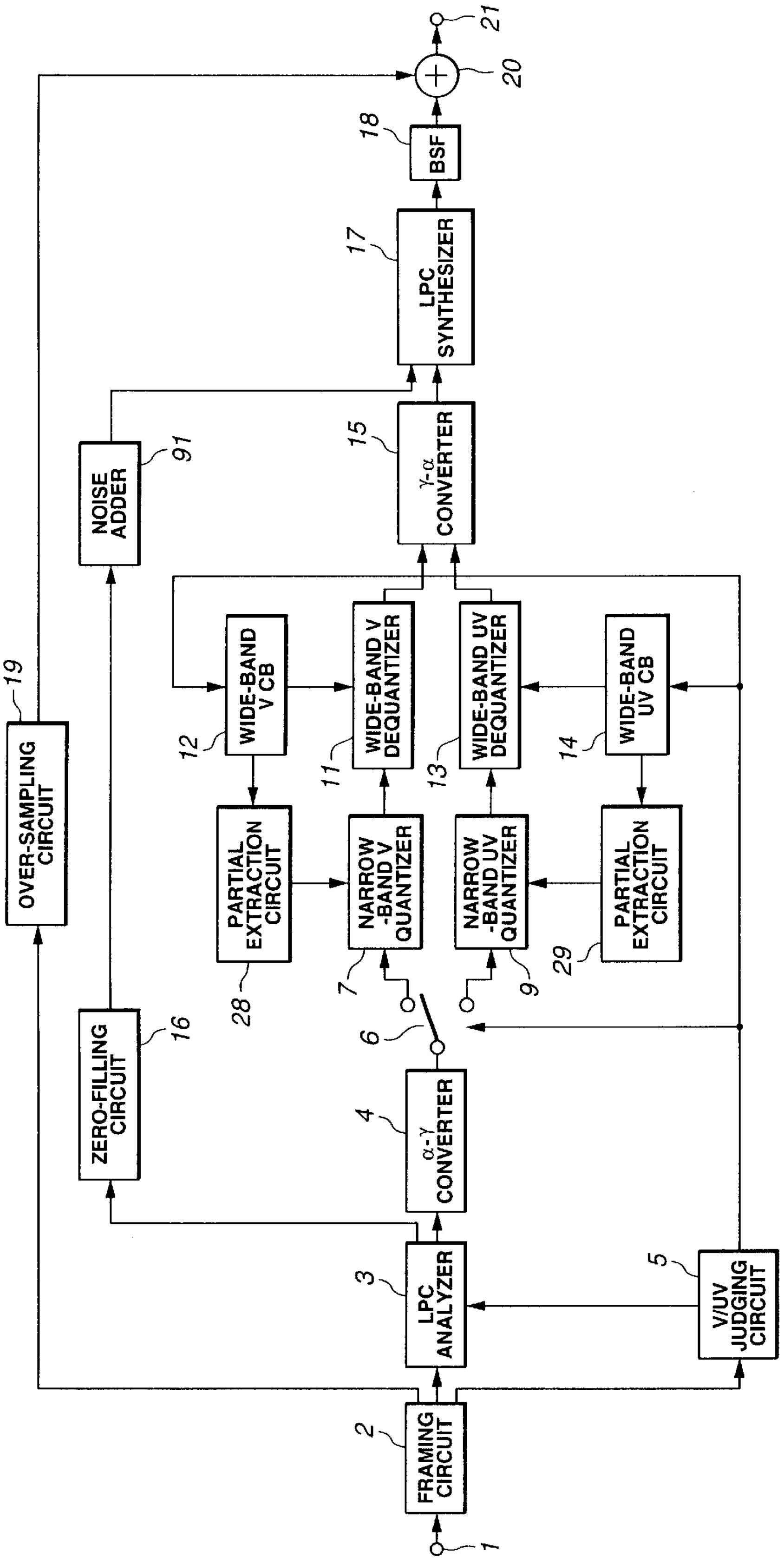
FIG. 13 is a block diagram of another variant of the sound synthesizer in FIG. 6, in which a reduced number of code books is used.

In the aforementioned variant of the sound synthesizer, however, there may be a case that an increased amount of computation is disadvantageous, which will cancel the advantage of the memory capacity reduction. To solve this problem, the present invention proposes also a further variant of the sound synthesizer. The variant is shown in FIG. 13. In this sound synthesizer, a sound synthesizing method according to the present invention is applied in which there are used only the wide-band code books and the amount of computation remains not increased. As shown, the sound synthesizer uses, in place of the arithmetic circuits 25 and 26 in FIG. 11, partial extraction circuits 28 and 29 to provide narrow-band parameters by partially extracting each code vector in the wide-band code books. In other respects, this variant is similar to the sound synthesizer shown in FIG. 6 or 11.

The autocorrelation of the impulse response of the BSF (band stop filter) having previously been shown is a power spectral characteristic of the BSF in the frequency domain as given by the following formula (3):

$$\Phi(h)=F^{-1}(|H|^2)=F^{-1}(H')=h' \quad (3)$$

Here will be considered another filter having the same frequency characteristic as the power characteristic of the above BSF. When the frequency characteristic is assumed to be H', the formula (3) can be expressed as given by the following formula (4):

$$\Phi(x_n)=\Phi(x_w)\otimes h' \quad (4)$$

The new filter given by the formula (4) has the same pass band and inhibition band as those of the aforementioned BSF and its attenuation characteristic is a square of that of the above BSF. Therefore, this new filter can also be said to be a band stop filter.

Taking the above in consideration, the narrow-band autocorrelation can be simplified as given by the following formula (5) by convoluting the wide-band autocorrelation and impulse response of the BSF, namely, by limiting the band of the wide-band autocorrelation:

$$\Phi(h)=F^{-1}(|H|^2)=F^{-1}(H')=h' \quad (5)$$

When the parameter used in the code book is an autocorrelation, the second-order autocorrelation in the actual voiced sound is smaller than the first-order one, and the third-order autocorrelation is further smaller that the second one, . . . . Namely, the autocorrelations will depict a monotonously descending curve.

On the other hand, since the narrow-band signal is acquired by passing the low frequency band of the wide-band signal, the narrow-band autocorrelation can theoretically be determined by passing the low frequency band of the narrow-band autocorrelation.

Since the wide-band autocorrelation itself varies along a gentle slope, however, it will little change even when its low frequency band is passed. Omission of the low-frequency band passing will cause no influence on the wide-band autocorrelation. Therefore, the wide-band autocorrelation can be used as the narrow-band autocorrelation itself. However, since the sampling frequency of the wide-band signal is two times higher than that of the narrow-band signal, the narrow-band autocorrelation will be taken from the wide-band autocorrelation at every other orders of the latter in practice.

The wide-band autocorrelation code vector taken at every other orders can be dealt with like the narrow-band autocorrelation code vector, and the input narrow-band sound autocorrelation can be quantized based on the wide-band code book. Thus, the narrow-band code book is unnecessary.

As having previously been described, the unvoiced sound (UV) has a large energy in the high frequency band thereof, so that if no correct prediction is possible, a large influence will result. Therefore, the input sound is normally determined to be V rather than UV and it is only when the probability that the input sound is UV that it is determined to be UV. Thus, the UV code book size is made smaller than the V code book and only UV vectors are definitely distinct from V vectors are registered in the UV code book. Although the UV autocorrelation does not depict so smooth a curve as the V autocorrelation, comparison of the wide-band autocorrelation code vectors taken at every other orders with the input narrow-band signal autocorrelation enables an autocorrelation equivalent to that when the low frequency band of the wide-band autocorrelation code vector is passed, namely, when the narrow-band code book exists. That is, neither narrow-band V nor UV code book is necessary.

As in the above, when the parameters used in the code book are taken as an autocorrelation, they can be quantized by comparing the autocorrelation of the input narrow-band sound with the wide-band code vectors taken at every other orders. This quantization can be implemented by allowing the partial extraction circuits 28 and 29 to take the wide-band code book vectors at every other orders at step S45 in FIG. 12.

A spectrum envelope depicted by connecting the parameters used in the code book will be described herebelow. Since it is apparent in this case that the narrow-band spectrum is a part of the wide-band spectrum, the narrow-band spectrum code book is not necessary. It is of course that the quantization is made possible by comparing the spectrum envelope of the input narrow-band sound with the part of the wide-band spectrum envelope code vector.

Figure 14:
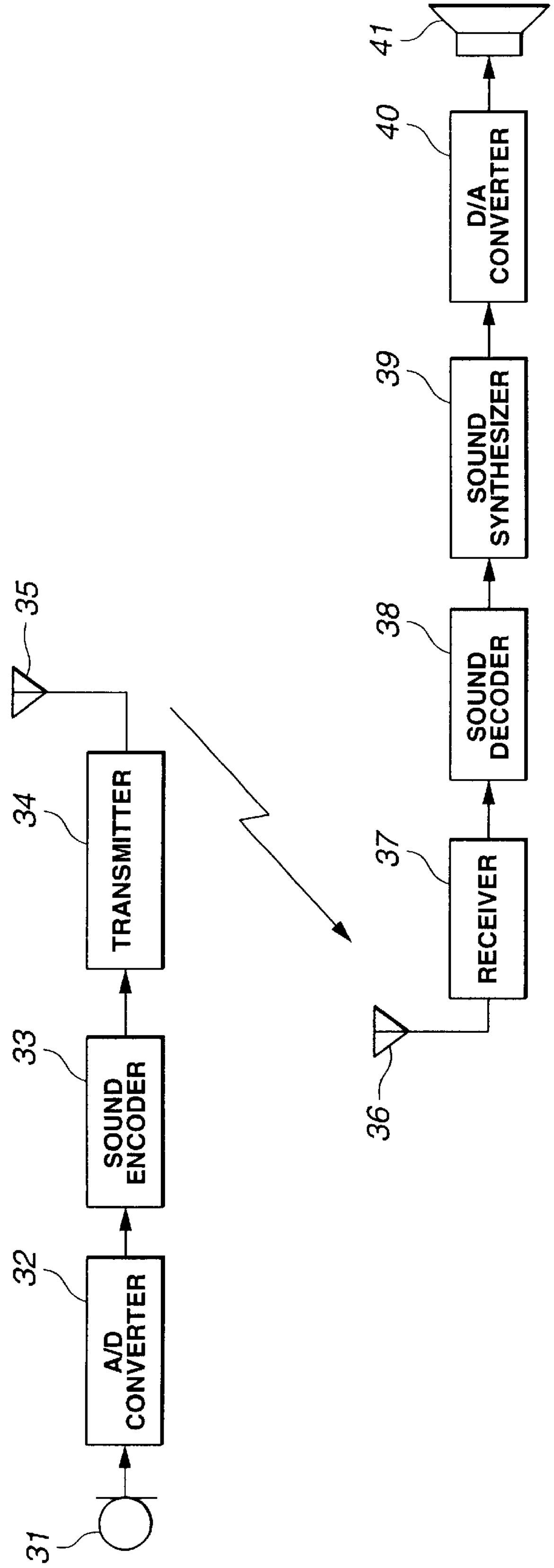
FIG. 14 is a block diagram of a digital portable telephone having a receiver to which the sound synthesizing method and apparatus according to the present invention are applied.

The application of the sound synthesizing method and apparatus according to the present invention will be described below with reference to the accompanying drawings. This application is a digital portable telephone apparatus having at the receiver side the sound synthesizer adapted to synthesize using plural kinds of input coded parameters as shown in FIG. 14.

The digital portable telephone apparatus is constructed as will be described below. In FIG. 14, the transmitter and receiver sections are provided separately from each other but actually housed together in one portable telephone apparatus.

In the transmitter section, a sound signal supplied from a microphone 31 is converted to a digital signal by an A/D converter 32, coded by a sound encoder 33, processed to be an output bit by a transmitter 34 for transmission from an antenna 35.

At this time, the sound encoder 33 supplies to the transmitter 34 coded parameters including an excitation source-related parameter, linear predictive factor $\alpha$, etc. taking in consideration a band narrowing along the transmission path.

In the receiver section, a radio wave captured by the antenna 36 is received by a receiver 37, the above-mentioned coded parameters are decoded by a sound decoder 38, a sound is synthesized by a sound synthesizer 39 using the above decoded parameters, the synthesized sound is rendered to an analog sound signal by a D/A converter 40, and the analog sound signal is delivered at a speaker 41.

Figure 15:
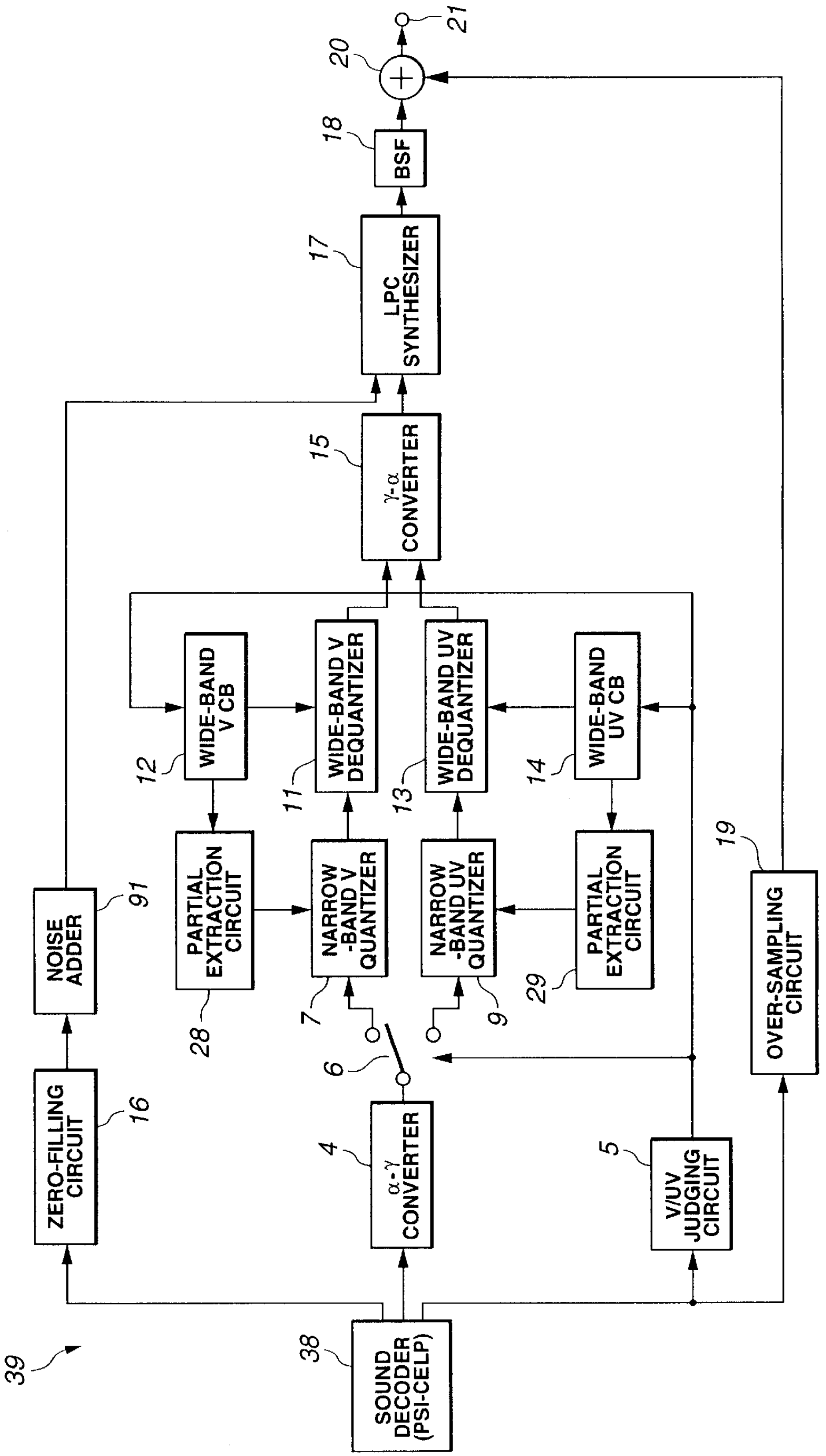
FIG. 15 is a block diagram of a sound synthesizer having a sound decoder in which the PSI-CELP method is adopted.

An embodiment of the sound synthesizer used in the digital telephone apparatus will be described with reference to FIG. 15. The sound synthesizer shown in FIG. 15 is adapted to synthesize a sound using coded parameters sent from the sound encoder 33 in the transmitter section of the digital portable telephone apparatus. For this sound synthesis, the coded parameters are decoded by the sound decoder 38 by reversely following the encoder procedure having been done in the sound encoder 33.

When the sound encoder 33 adopts the PSI (Pitch Synchronous Innovation)-CELP method for the parameter coding, the sound decoder 38 also adopts the PSI-CELP method.

The sound encoder 38 decodes a narrow-band excitation source from a excitation source-related parameter being a first one of the coded parameters and sends it to the zero-filling circuit 16. A linear predictive factor α being a second one of the coded parameters is supplied to the linear-predictive factor/auto-correlation (α→γ) converter 4. Also, a voiced/unvoiced (V/UV) sound judging flag being a third one of the coded parameters is supplied to the V/UV judging circuit 5.

The sound synthesizer includes the sound encoder 38, zero-filling circuit 16, noise adder 91, α→γ converter 4 and V/UV judging circuit 5, and in addition, the wide-band voiced and unvoiced sound code books 12 and 14 previously generated using the voiced and unvoiced sound parameters extracted from wide-band voiced and unvoiced sounds.

Further, the sound synthesizer includes the partial extraction circuits 28 and 29 to provide narrow-band parameters by partially extracting each code vector in the wide-band voiced and unvoiced sound code books 12 and 14, narrow-band voiced sound quantizer 7 to quantize the narrow-band voiced sound autocorrelation from the α→γ converter 4 using the narrow-band parameter from the partial extraction circuit 28, narrow-band unvoiced sound quantizer 9 to quantize the narrow-band unvoiced autocorrelation from the α→γ converter 4 using the narrow-band unvoiced parameter from the partial extraction circuit 29, wide-band voiced sound dequantizer 11 to dequantize the narrow-band voiced sound quantized data from the narrow-band voiced sound quantizer 7 using the wide-band voiced sound code book 12, wide-band unvoiced sound dequantizer 13 to dequantize the narrow-band unvoiced sound quantized data from the narrow-band unvoiced sound quantizer 9 using the wide-band unvoiced sound code book 14, autocorrelation/linear predictive factor (γ→α) converter 15 to convert a wide-band voiced sound autocorrelation being the dequantized data from the wide-band voiced sound dequantizer 11 to a wide-band voiced sound linear predictive factor while converting a wide-band unvoiced sound autocorrelation being the dequantized data from the wide-band unvoiced sound dequantizer 13 to a wide-band unvoiced sound linear predictive factor, and the LPC synthesizer 17 to synthesize a wide-band sound based on the wide-band voiced and unvoiced sound linear predictive factors from the converter 15 and the excitation source to which the noise signal has been added by the noise adder 91.

Furthermore, the sound synthesizer includes the over-sampling circuit 19 to over-sample the sampling frequency of the narrow-band sound decoded by the sound decoder 38 from 8 kHz to 16 kHz, band-stop filter (BSF) 18 to remove from the synthetic output from the LPC synthesizer 17 a signal component of 300 to 3,400 Hz in the input narrow-band sound signal, and an adder 20 to add to the output from the BSF 18 the original narrow-band sound signal supplied from the over-sampling circuit 19 and whose sampling frequency is 16 kHz and frequency band is 300 to 3,400 Hz.

The wide-band voiced and unvoiced sound code books 12 and 14 can be generated by following the procedures shown in FIGS. 7 to 9. For a quality code book, only sounds which are positively V and those which are surely UV are taken as learning data while sounds in transition from V to UV or from UV to V and those not easily determinable to be V or UV are excluded. Thus, a narrow-band learning V frames list and a narrow-band learning UV frames list are acquired.

Figure 16:
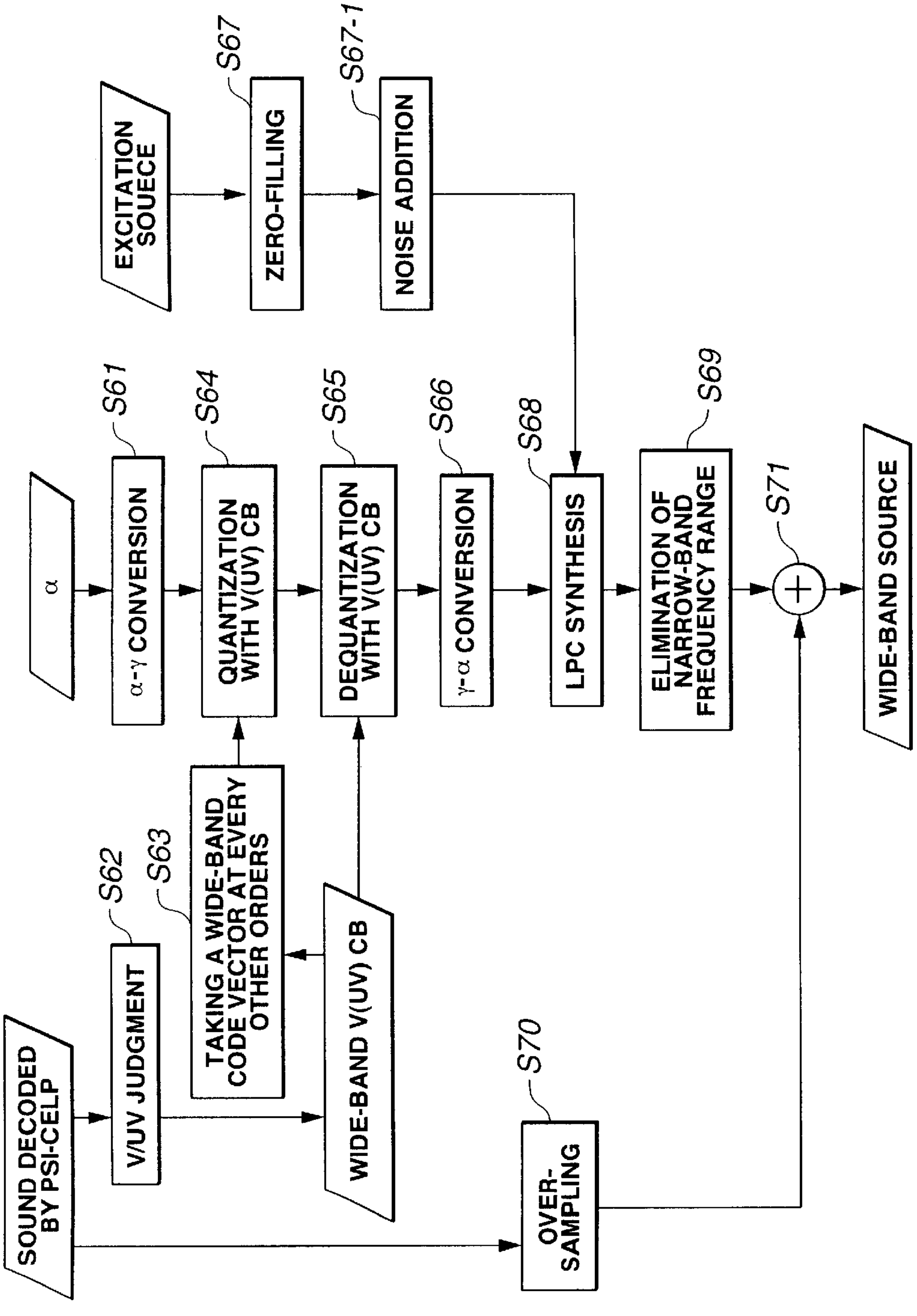
FIG. 16 is a flow chart of operations of the sound synthesizer in FIG. 15.

Then the wide-band voiced and unvoiced sound code books 12 and 14 as well as the coded parameters sent actually from the transmitter section are used to synthesize a sound, which will be described herebelow with reference to FIG. 16.

First, the linear predictive factor α decoded by the sound decoder 38 is converted to the autocorrelation γ by the α→γ converter 4 at step S61.

The parameter concerning the voiced/unvoiced sound judging flag decoded by the sound decoder 38 is decoded by the V/UV judging circuit 5 at step S62 to judge whether the sound is a voiced (V) or unvoiced (UV) sound.

When it is determined to be V, the switch 6 to select a destination of the output from the α→γ converter 4 is connected to the narrow-band voiced sound quantizer 7. When it is determined to be UV, the switch 6 is connected to the narrow-band unvoiced sound quantizer 9.

Note that this V/UV judgment is different from that effected for the code book generation and the frame signal is always judged to be either V or UV.

When the V/UV judging circuit 5 has judged a sound signal to be V, the voiced sound autocorrelation γ from the switch 6 is supplied to and quantized by the narrow-band V quantizer 7 at step S64. However, there is used in this quantization no narrow-band code book but the narrow-band parameter having been acquired by means of the partial extraction circuit 28 at step S63.

On the other hand, when the V/UV judging circuit 5 has judged the sound signal to V, the unvoiced sound autocorrelation γ from the switch 6 is supplied to and quantized by the narrow-band UV quantizer 9 at step 63. Also in this quantization, no narrow-band UV code book is used but the narrow-band UV parameter having been acquired by means of the partial extraction circuit 29 to quantize the sound signal.

Then at step S65, the quantized data is dequantized by the wide-band V dequantizer 11 or wide-band UV dequantizer 13 using the wide-band V code book 12 or wide-band UV code book 14 to provide a wide-band autocorrelation.

The wide-band autocorrelation is converted to a wide-band linear predictive factor α by the γ→α converter 15 at step S66.

On the other hand, the excitation source-related parameter from the sound decoder 38 is filled with a zero between samples by the zero-filling circuit 16 and thus up-sampled, and band-widened by aliasing, at step S67. At step S67-1, a noise signal is added to the wide-band excitation source by the noise adder 91 and then supplied to the LPC synthesizer 17.

At step S68, the wide-band linear predictive factor α and the wide-band excitation source are subjected to LPC synthesis in the LPC synthesizer 17 to provide a wide-band sound signal.

However, the wide-band sound signal itself is only a wide-band signal acquired by prediction and contains a prediction-caused error. Especially so long as the frequency range of the input narrow-band sound is concerned, the input sound should be used as it is.

Therefore, the frequency range of the input narrow-band sound is filtered out by the BSF 18 at step S69. Then, the resulted data and over-sampled coded data from the over-sampling circuit 19 at step S70 are added together at step S71.

As having been described in the foregoing, in the sound synthesizer shown in FIG. 15, the quantization is not effected by comparison with the narrow-band code book code vector but by comparison with the code vector acquired by partial extraction from the wide-band code book.

That is, the parameter a can be obtained during decoding. It is converted to a narrow-band autocorrelation, compared with a wide-band code book code vector taken at every other orders and thus quantized. In this sound synthesizer, the dequantization is done using all the same code vectors to provide a wide-band autocorrelation. The wide-band autocorrelation is converted to a wide-band linear predictive factor α. At this time, the gain adjustment and some wide-band suppression are also done as having been described to improve the sound quality.

Thus, the wide-band code book is used for both the analysis and synthesis, so that the memory for holding the narrow-band code book is not required.

Also in this sound synthesizer, a noise signal having a frequency band of 3,400 to 4,600 Hz is generated by the noise adder 91, adjusted in gain, and added to an excitation source excW having been filled with zeros at the zero-filling circuit 16. The wide-band excitation source thus obtained is flatter to provide a quality wide-band sound signal.

Figure 17:
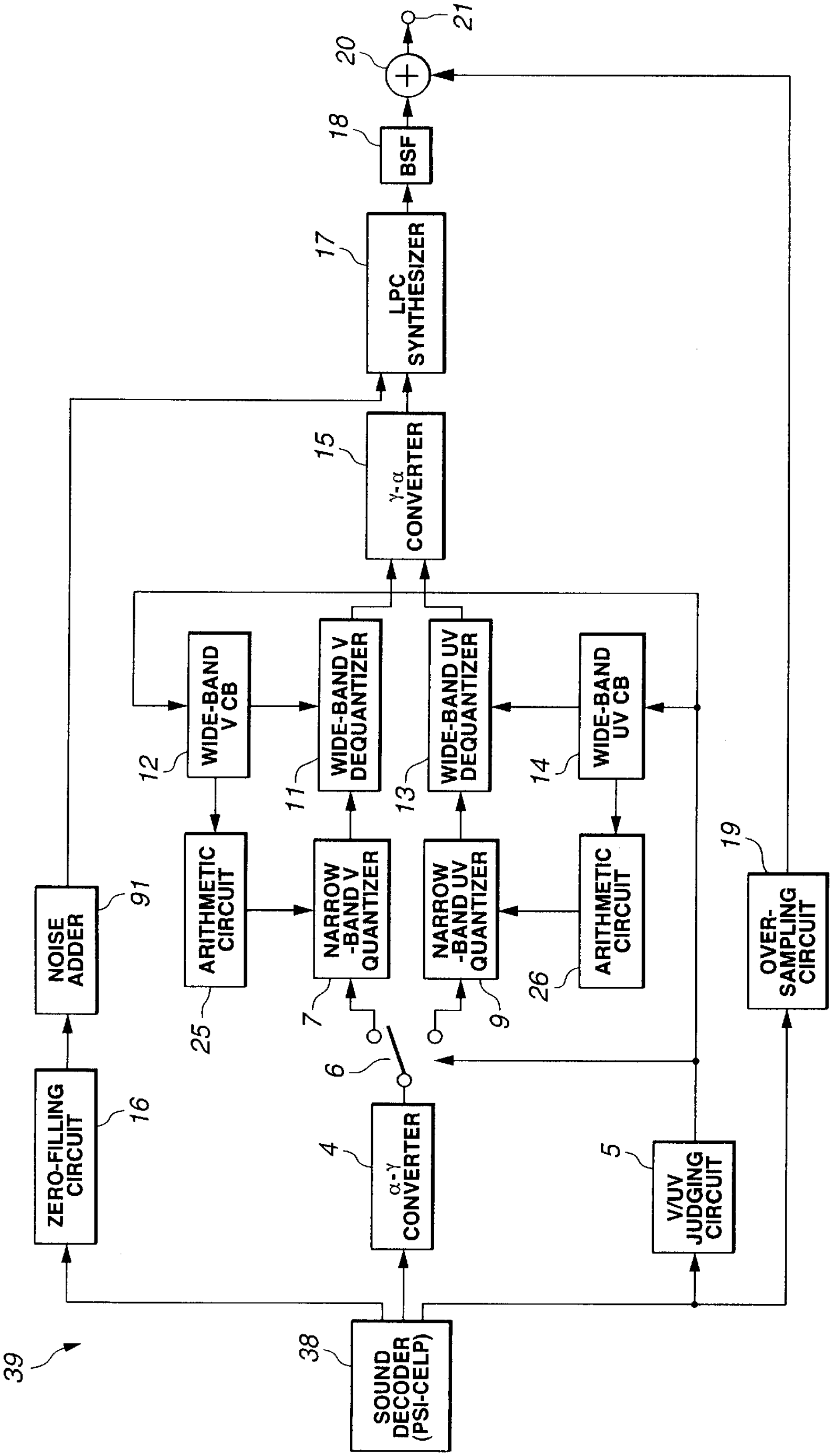
FIG. 17 is a flow chart of operations of a variant of the sound synthesizer having a sound decoder in which the PSI-CELP method is adopted.

The sound synthesizer adopting the PSI-CELP to synthesize a sound using the coded parameters from the sound decoder 38 may be a one shown in FIG. 17. As shown, this sound synthesizer uses in place of the partial extraction circuits 28 and 29 arithmetic circuits 25 and 26 to provide narrow-band V (UV) parameters by calculating each code vector in the wide-band code book. This sound synthesizer is identical to the one shown in FIG. 15 in other respects.

Figure 18:
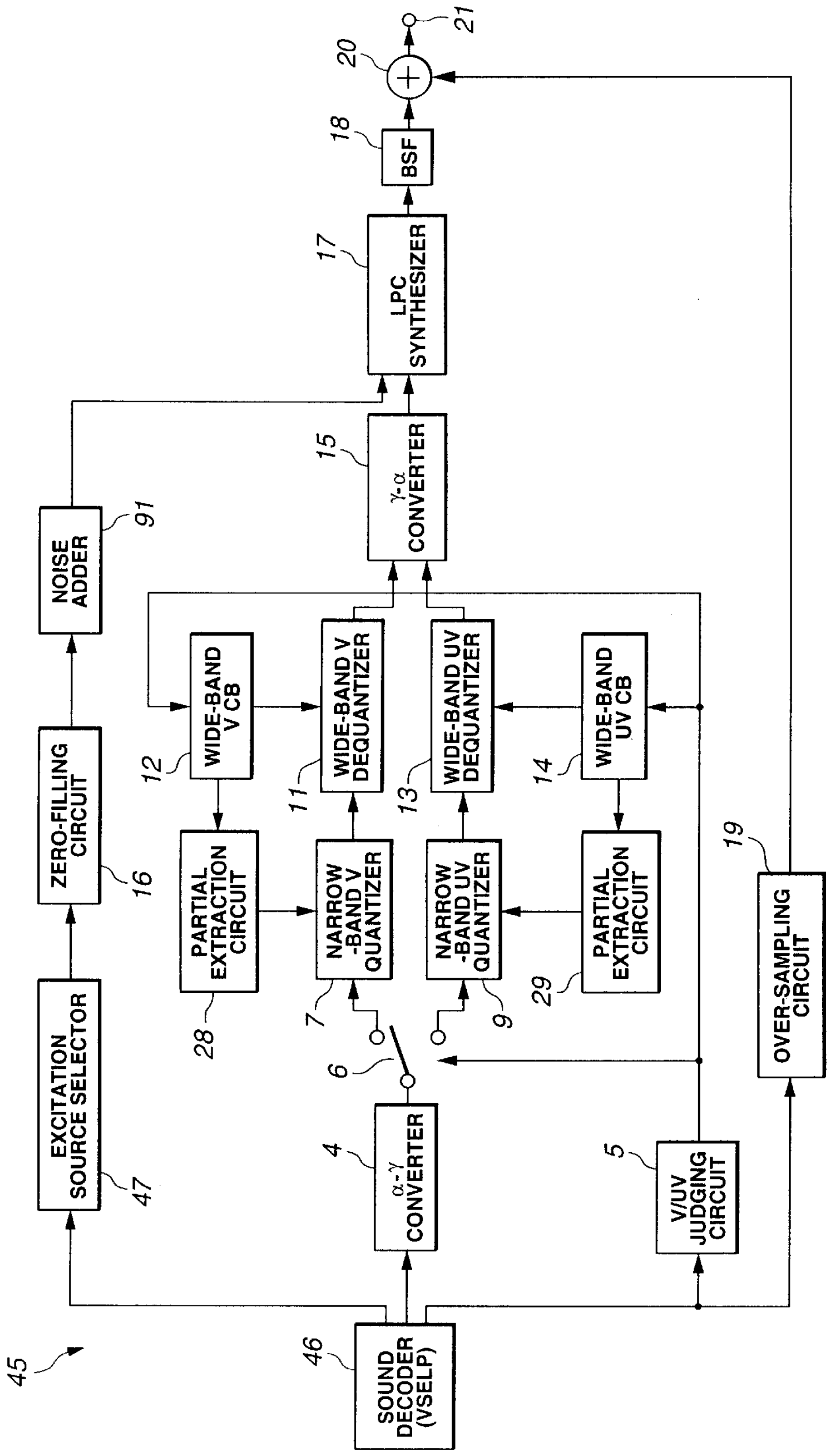
FIG. 18 is a block diagram of a sound synthesizer having a sound decoder in which the VSELP method is adopted.

A second embodiment of the sound synthesizer used in the digital portable telephone apparatus is shown in FIG. 18. Since this embodiment of the sound synthesizer is also adapted to synthesize a sound using the coded parameters sent from the sound encoder 33 of the transmitter sector in the digital portable telephone apparatus, the sound decoder 46 reversely effects the ending having been effected by the sound encoder 33.

When the encoding by the sound encoder 33 is based on the VSELP (Vector Sum Excited Linear Prediction), the decoding by the sound decoder 46 is also based on the VSELP.

The sound decoder 46 supplies an excitation source selector 47 with a parameter related to an excitation source being a first one of the coded parameters, the linear predictive factor/autocorrelation (α→γ) converter 4 with a linear predictive factor α being a second one of the coded parameters, and the V/UV judging circuit 5 with a voiced/unvoiced sound judging flag being a third one of the coded parameters.

This sound synthesizer is identical to those shown in FIGS. 15 and 17 and adopting the PSI-CELP provided that the excitation source selector 47 is provided upstream of the zero-filling circuit 16.

Figure 19:
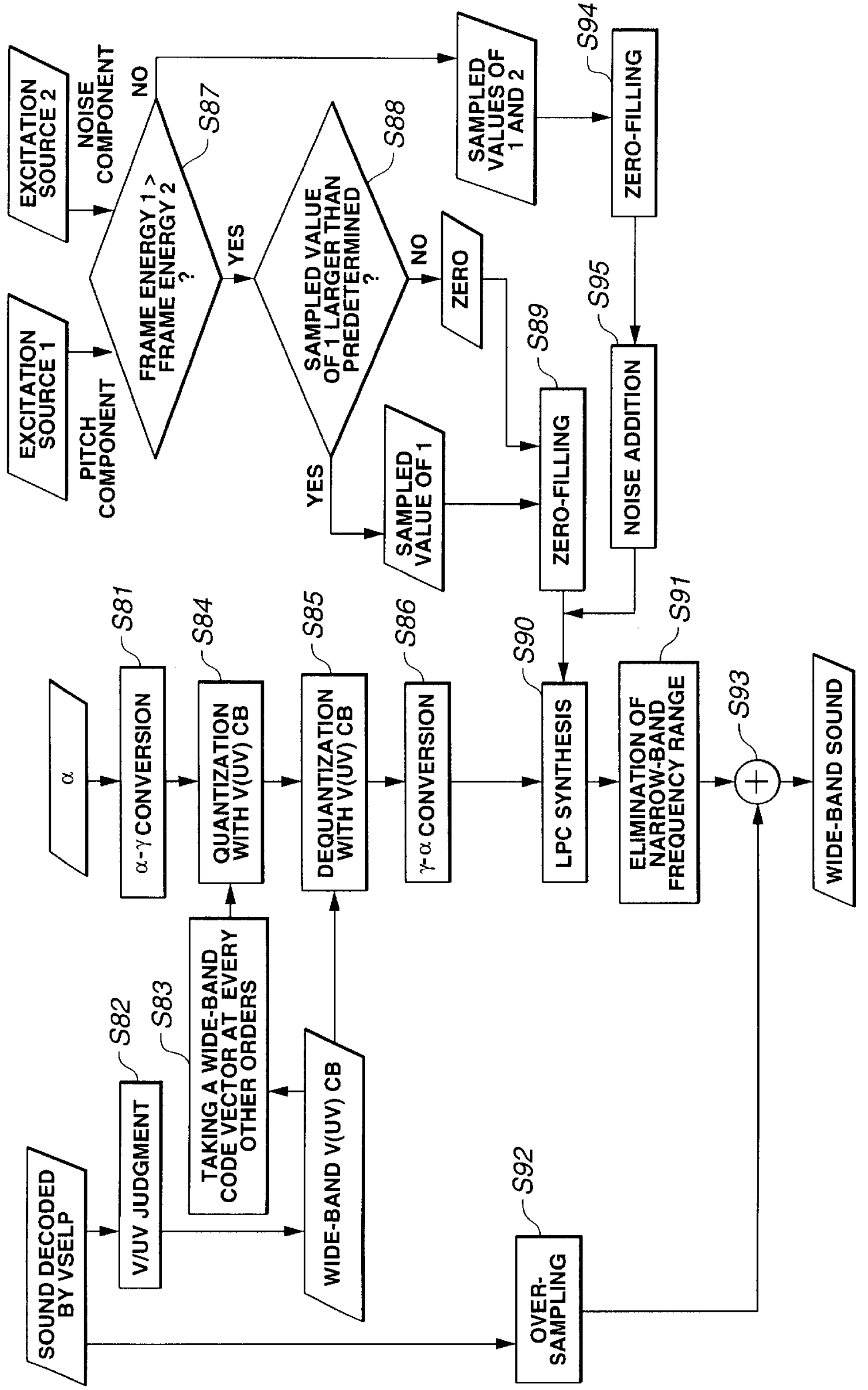
FIG. 19 is a flow chart of operations of the sound synthesizer in FIG. 18.

In the PSI-CELP type sound synthesizer, the codec processes the voiced sound among others so that the voiced sound is smoothly audible. However, the VSELP type sound synthesizer has not this feature, so that when the bandwidth is increased, the voiced sound will be audible as if it included some noise. To avoid this, when a wide-band excitation source is generated, the excitation source selector 47 works as will be described below with reference to FIG. 19.

The excitation source in the VSELP type synthesizer is generated as beta*bL[i]+gammal*cl[i] where the beta is a long-term predictive factor, bL[i] is a gain and the cl[i] is an excitation code vector. The beta*bL[i] is a pitch component and the gammal*cl[i] is a noise component. At step S87, when the energy of the beta*bL[i] is determined to be larger than that of the gammal*cl[i] for a fixed length of time, the input sound is considered to a voiced sound having a strong pitch. So, the operations goes to YES at step S88. The excitation source is a train of pulses. When the input sound has no pitch component, the operation goes to NO, and the input sound is suppressed to zero. This input sound is filled with zeros at step S89. In the VSELP type sound synthesizer, no noise is added to the . If the beta*bL[i] is determined not to be larger than that of the gammal*cl[i] at step S87, a sound is synthesized from a sample value of 1 and a one of 2. After the synthesized sound is filled with zeros at step S94, a noise is added to it at step S95. Thereafter, an LPC synthesis is effected at step S90. Thus, the voiced sound synthesized by the VSELP type sound synthesizer can be heard better.

Figure 20:
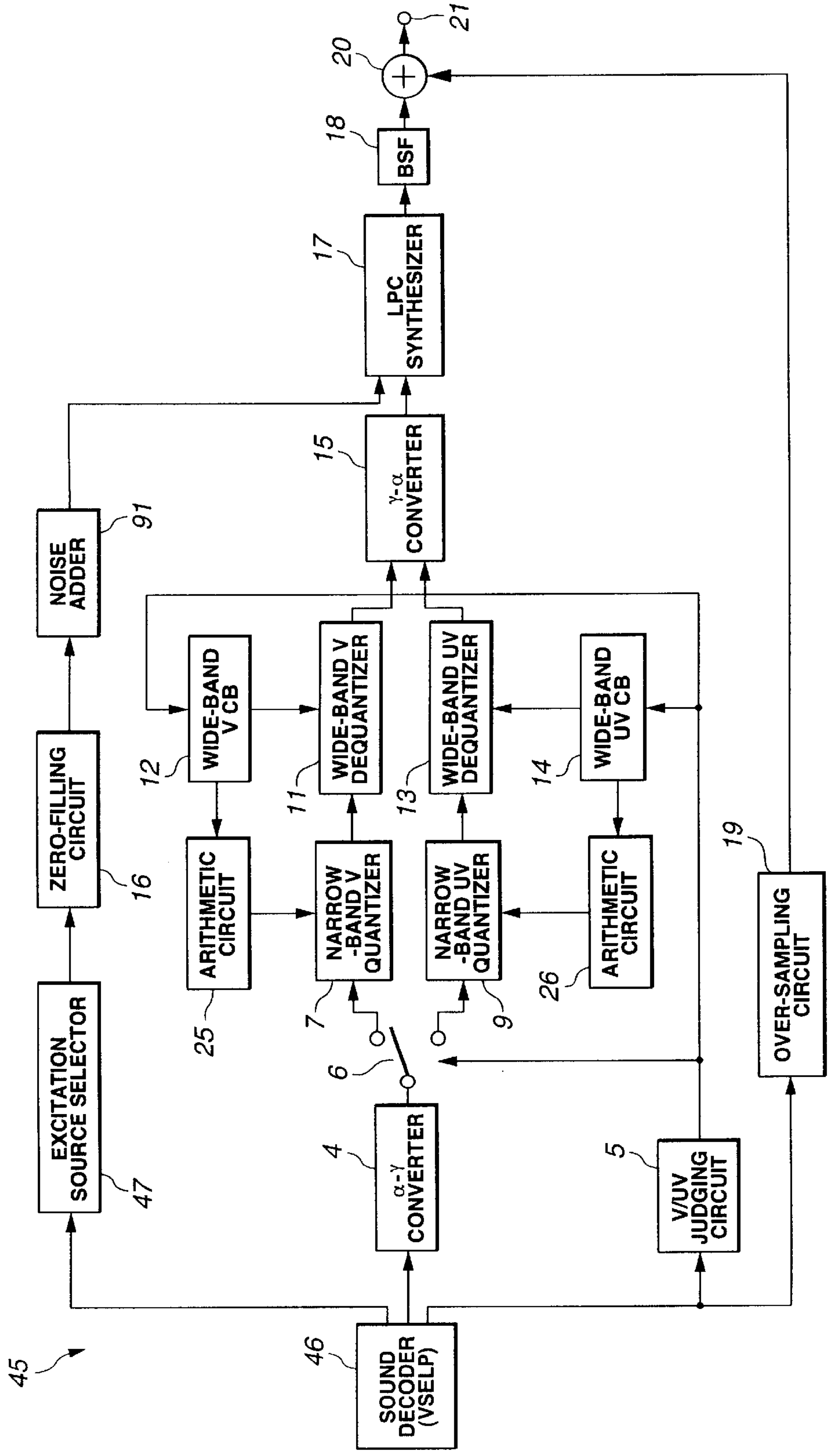
FIG. 20 is a block diagram of a variant of the sound synthesizer having a sound decoder in which the VSELP method is adopted.

Note that the VSELP type sound synthesizer to synthesize a sound using coded parameters from the sound decoder 46 may be a one shown in FIG. 20. The sound synthesizer shown in FIG. 20 uses in place of the partial extraction circuits 28 and 29 arithmetic circuits 25 and 26 to compute narrow-band voiced and unvoiced parameters from code vectors in the wide-band code book. This sound synthesizer is identical to the one shown in FIG. 18 in other respects.

Also in this sound synthesizer, a sound can be synthesized using the narrow-band voiced sound code book 12 and wide-band unvoiced sound code book 14 previously generated using voiced and unvoiced parameters extracted from a wide-band voiced sound and unvoiced sound as shown in FIG. 6, and the narrow-band voiced and unvoiced sound code books 7 and 10 previously generated using voiced and unvoiced parameters extracted from a narrow-band sound signal having a frequency band of 300 to 3,400 Hz and having been acquired by limiting the frequency band of the wide-band sound.

Note that the present invention is not limited to a sound synthesizer adapted to predict a high frequency band from a low one. The means for predicting the wide-band spectrum is also applicable to an other signal than a sound.

Further, the present invention may not use only the linear predictive analysis but also the PARCOR analysis.

By recording in a recording medium such as ROM the sound synthesizing method according to the present invention as a program, a sound synthesizer can be implemented by a personal computer.

Figure 21:
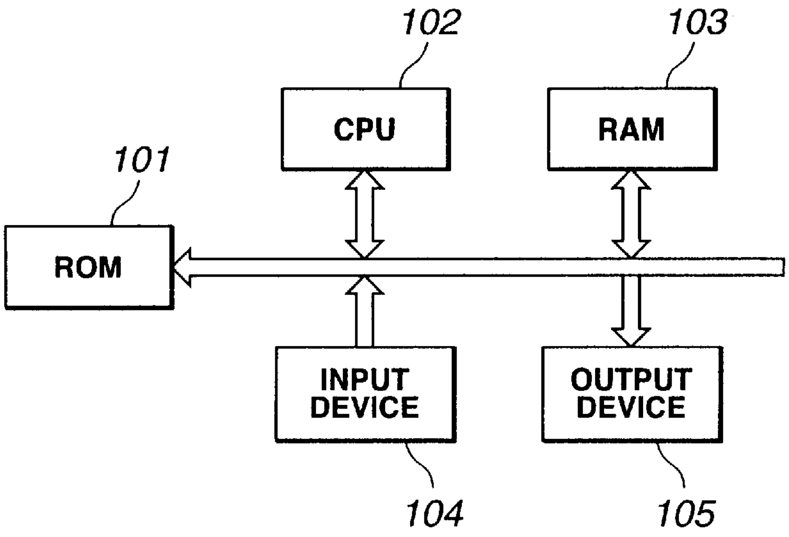
FIG. 21 is a block diagram of a personal computer adapted to read a sound synthesizing program from a ROM being a program service medium according to the present invention.

FIG. 21 shows an embodiment of such a personal computer. The personal computer includes a ROM (read-only memory) 101 in which the sound synthesizing method configured as a sound synthesis program is stored, and a CPU (central processing unit) 102 which recalls the sound synthesis program from the ROM 101 and executes it.

The personal computer further includes a RAM (random access memory) 103 in which programs and data required for operation of the CPU 102 are stored, an input device 104 consisting of a microphone, external interface, etc. for example, and an output device 105 consisting of a display device, speaker, etc. for example to output necessary information.

What is claimed is:

1. A sound synthesizing apparatus for synthesizing a wide-band signal from a part of an output signal acquired by a filtering synthesizer having an input parameter that is one of a linear prediction residual and an excitation source of a narrow-band signal, the apparatus comprising:

means for generating a wide-band excitation source signal from one of the linear prediction residual and the excitation source; and means for adding a noise signal to the wide-band excitation source signal.

2. The apparatus as set forth in claim 1, wherein the noise signal has a signal component having a frequency not included in a frequency band of the wide-band excitation source signal.

3. A sound synthesizing apparatus for synthesizing a wide-band signal from a part of an output signal acquired by a filtering synthesizer having an input parameter that is one of a linear prediction residual and an excitation source of a narrow-band signal, the apparatus comprising:

means for adding a noise signal to one of the linear prediction residual and the narrow band signal of the excitation source; and means for generating a wide-band excitation source signal from one of the linear prediction residual and the narrow-band signal of the excitation source to which the noise signal has been added by the means for adding a noise signal.

4. The apparatus as set forth in claim 3, wherein the noise signal has a signal component having a frequency not included in a frequency band of the narrow-band signal of the excitation source.

5. A sound synthesizing apparatus for synthesizing a wide-band signal from a part of an output signal acquired by a filtering synthesizer having an input parameter that is one of a linear prediction residual and an excitation source of a narrow-band signal, the apparatus comprising:

means for analyzing the narrow-band signal to provide a linear prediction residual signal;

means for generating a wide-band residual signal from the linear prediction residual provided by the means for analyzing; and means for adding to the wide-band residual signal a noise signal with a signal component having a frequency that is not included in a frequency band of the wide-band residual signal generated by the means for generating a wide-band residual signal.

6. The apparatus as set forth in claim 5, wherein the noise signal has a signal component having a frequency that is not included in a frequency band of the narrow-band signal.

7. A sound synthesizing apparatus for synthesizing a wide-band signal from a part of an output signal acquired by a filtering synthesizer having an input parameter that is one of a linear prediction residual and an excitation source of a narrow-band signal, the apparatus comprising:

means for analyzing the narrow-band signal to provide a linear prediction residual signal;

means for adding to the linear prediction residual signal a noise signal with a signal component having a frequency that is not included in a frequency band of the linear prediction residual signal generated by the means for analyzing; and means for generating a wide-band residual signal from the linear prediction residual signal to which the noise signal has been added by the means for adding.

8. The apparatus as set forth in claim 7, wherein the noise signal has a signal component having a frequency that is not included in a frequency band of the narrow-band signal of the excitation source.

9. A sound synthesizing method for synthesizing a wide-band signal from a part of an output signal acquired by a filtering synthesizer having an input parameter that is one of a linear prediction residual and an excitation source of a narrow-band signal, the method comprising steps of:

generating a wide-band excitation source signal from one of the linear prediction residual and narrow-band signal of the excitation source; and adding a noise signal to the wide-band excitation source signal.

10. The method as set forth in claim 9, wherein the noise signal has a signal component having a frequency that is not included in a frequency band of the wide-band excitation source signal.

11. A sound synthesizing method for synthesizing a wide-band signal from a part of an output signal acquired by a filtering synthesizer having an input parameter that is one of a linear prediction residual and an excitation source of a narrow-band signal, the method comprising the steps of:

adding a noise signal to one of the linear prediction residual and the narrow-band signal of the excitation source; and generating a wide-band excitation source signal from one of the linear prediction residual and the narrow-band signal of the excitation source to which the noise signal has been added at the adding a noise signal step.

12. The method as set forth in claim 11, wherein the noise signal has a signal component having a frequency that is not included in a frequency band of the narrow-band signal of the excitation source.

13. A sound synthesizing method for synthesizing a wide-band signal from a part of an output signal acquired by a filtering synthesizer having an input parameter that is one of a linear prediction residual and an excitation source of a narrow-band signal, the method comprising the steps of:

analyzing the narrow-band signal to provide a linear prediction residual signal;

generating a wide-band residual signal from the linear prediction residual signal acquired at the analyzing step; and adding to the wide-band residual signal a noise signal with a signal component having a frequency that is not included in a frequency band of the wide-band residual signal generated by the step of generating.

14. The method as set forth in claim 13, wherein the noise signal has a signal component having a frequency that is not included in a frequency band of the narrow-band signal of the excitation source.

15. A sound synthesizing method for synthesizing a wide-band signal from a part of an output signal acquired by a filtering synthesizer having an input parameter that is one of a linear prediction residual and an excitation source of a narrow-band signal, the method comprising steps of:

analyzing the narrow-band signal to provide a linear prediction residual signal;

adding to the residual signal a noise signal with a signal component having a frequency that is not included in a frequency band of the linear prediction residual signal provided by the analyzing step; and generating a wide-band residual signal from the linear prediction residual signal to which the noise signal has been added at the step of adding.

16. The method as set forth in claim 15, wherein the noise signal has a signal component having a frequency that is not included in a frequency band of the narrow-band signal of the excitation source.

17. A telephone apparatus comprising:

transmitting means for transmitting parameters of a narrow-band signal encoded by one of a PSI-CELP and a VSELP method as a transmission signal; and receiving means for adding a noise signal to one of a linear prediction residual and an excitation source signal included in the parameters and synthesizing a wide-band signal from a part of an output signal acquired by a filtering synthesis.

18. A telephone apparatus comprising:

transmitting means for transmitting parameters of a narrow-band signal encoded by one of a PSI-CELP and an VSELP method as a transmission signal; and receiving means for generating a wide-band excitation source signal from one of a linear prediction residual and an excitation source included in the parameters, adding a noise signal to the wide-band excitation source signal, and synthesizing a wide-band signal from a part of an output signal acquired by a filtering synthesis.

19. A telephone apparatus comprising:

transmitting means for transmitting parameters of a narrow-band signal encoded by one of a PSI-CELP and a VSELP method as a transmission signal; and receiving means for adding a noise signal to one of a linear prediction residual and an excitation source included in the parameters, for generating a wide-band excitation source signal from one of the linear prediction residual and the excitation source to which the noise signal has been added, and for synthesizing a wide-band signal from a part of an output signal acquired by a filtering synthesis.

20. A program service medium for providing a sound synthesis program for synthesis of a wide-band signal from a part of an output signal acquired by a filtering synthesis whose input parameter is one of a linear prediction residual and an excitation source of a narrow-band signal, the program comprising procedures of:

generating a wide-band excitation source signal from one of the linear prediction residual and the excitation source; and adding a noise signal to the wide-band excitation source signal.

21. A program service medium for providing a sound synthesis program for synthesis of a wide-band signal from a part of an output signal acquired by a filtering synthesis whose input parameter is one of a linear prediction residual and an excitation source of a narrow-band signal, the program including procedures of:

adding a noise signal to one of the linear prediction residual and the narrow-band signal of the excitation source; and generating a wide-band excitation source signal from one of the linear prediction residual and the excitation source to which the noise signal has been added in the procedure of adding.

22. A program service medium for providing a sound synthesis program for synthesis of a wide-band signal from a part of an output signal acquired by a filtering synthesis whose input parameter is a linear prediction residual of a narrow-band signal, the program service medium including procedures of:

analyzing the narrow-band signal to provide a linear prediction residual signal;

generating a wide-band residual signal from the linear prediction residual signal acquired in the procedure of analyzing; and adding to the wide-band residual signal a noise signal having a signal component with a frequency that is not included in a frequency band of the wide-band residual signal generated in the procedure of generating a wide-band residual signal.

23. A program service medium for providing a sound synthesis program for synthesis of a wide-band signal from a part of an output signal acquired by a filtering synthesis whose input parameter is a linear prediction residual of a narrow-band signal, the program including procedures of:

analyzing the narrow-band signal to provide a linear prediction residual signal;

adding to the residual signal a noise signal having a signal component with a frequency that is not included in a frequency band of the linear prediction residual signal acquired in the procedure of analyzing; and generating a wide-band residual signal from the linear prediction residual signal to which the noise procedure of signal has been added in the procedure of adding.

* * * * *